(12) United States Patent
Ueda et al.

(10) Patent No.: US 9,386,174 B2
(45) Date of Patent: Jul. 5, 2016

(54) IMAGE FORMING APPARATUS, METHOD FOR GUIDANCE ON OPERATION METHOD BY IMAGE FORMING APPARATUS, AND SYSTEM

(71) Applicant: Konica Minolta, Inc., Chiyoda-ku (JP)

(72) Inventors: Hiroki Ueda, Toyohashi (JP); Kaoru Fukuoka, Amagasaki (JP); Tomoyuki Atsumi, Toyohashi (JP); Masao Hosono, Toyokawa (JP); Takashi Oikawa, Toyohashi (JP); Tatsuya Kitaguchi, Toyokawa (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 14/271,999

(22) Filed: May 7, 2014

(65) Prior Publication Data

US 2014/0333964 A1    Nov. 13, 2014

(30) Foreign Application Priority Data

May 9, 2013    (JP) .................................. 2013-099258

(51) Int. Cl.
*H04N 1/00* (2006.01)
*G06F 3/12* (2006.01)
*G06K 15/00* (2006.01)

(52) U.S. Cl.
CPC .......... *H04N 1/00381* (2013.01); *G06F 3/1203* (2013.01); *G06F 3/1237* (2013.01); *G06F 3/1286* (2013.01); *G06K 15/005* (2013.01); *H04N 1/00183* (2013.01); *H04N 1/00411* (2013.01); *H04N 1/00469* (2013.01);

(Continued)

(58) Field of Classification Search
CPC .......... H04N 1/00381; H04N 1/00973; H04N 1/00183
USPC ................................ 358/1.1–3.29, 1.11–1.18
See application file for complete search history.

(56) References Cited

U.S. PATENT DOCUMENTS 5,377,319 A    12/1994 Kitahara et al.
5,539,530 A    7/1996 Reifman et al.
(Continued)

FOREIGN PATENT DOCUMENTS

EP    0632638 A1    4/1995
EP    0978985 A2    2/2000
(Continued)

OTHER PUBLICATIONS

Final Rejection issued Apr. 21, 2015 in corresponding Japanese Patent Application No. 2013-099258, filed on May 9, 2013, with full English translation (12 pages).
(Continued)

*Primary Examiner* — Marcellus Augustin
(74) *Attorney, Agent, or Firm* — Buchanan Ingersoll & Rooney PC

(57) ABSTRACT

An image forming apparatus includes a touch panel connected to a network, for displaying an icon accepting an inquiry about an operation and a control unit for controlling an operation. The control unit is configured to transmit an inquiry about an operation to a terminal through the network, to receive an answer based on the inquiry from the terminal, and to display on the touch panel, an operation instruction based on operation method instruction information indicating the answer.

21 Claims, 25 Drawing Sheets

(52) U.S. Cl.
CPC .... *H04N1/00973* (2013.01); *H04N 2201/0094* (2013.01); *H04N 2201/3261* (2013.01); *H04N 2201/3273* (2013.01); *H04N 2201/3274* (2013.01)

(56) References Cited

U.S. PATENT DOCUMENTS

| | | | |
|---|---|---|---|
| 2003/0095291 A1 | 5/2003 | Dow et al. | |
| 2004/0162890 A1 | 8/2004 | Ohta | |
| 2006/0212827 A1* | 9/2006 | Lee | 715/810 |
| 2008/0036757 A1* | 2/2008 | Furukawa et al. | 345/418 |
| 2009/0213083 A1 | 8/2009 | Dicker et al. | |
| 2009/0237371 A1* | 9/2009 | Kim et al. | 345/173 |
| 2010/0302173 A1 | 12/2010 | Deng et al. | |
| 2012/0075670 A1 | 3/2012 | Yamaguchi | |
| 2012/0206388 A1 | 8/2012 | Tsuboi et al. | |
| 2012/0327443 A1 | 12/2012 | Fujii | |
| 2013/0082960 A1 | 4/2013 | Otake et al. | |
| 2014/0101546 A1 | 4/2014 | Taoka et al. | |

FOREIGN PATENT DOCUMENTS

| | | |
|---|---|---|
| JP | 6-37962 A | 2/1994 |
| JP | 2008-219351 A | 9/2008 |
| JP | 2009205685 A | 9/2009 |
| JP | 2010250628 A | 11/2010 |
| JP | 2010277089 A | 12/2010 |
| JP | 2011257992 A | 12/2011 |
| JP | 2012023491 A | 2/2012 |
| JP | 2012123066 A | 6/2012 |
| JP | 2012168890 A | 9/2012 |
| JP | 2013008729 A | 1/2013 |
| JP | 2013076895 A | 4/2013 |
| WO | 2012169157 A1 | 12/2012 |

OTHER PUBLICATIONS

European Search Report Issued Mar. 3, 2015 in corresponding EP Application No. 14166846.7 (6 pages).

* cited by examiner

IMAGE FORMING APPARATUS, METHOD FOR GUIDANCE ON OPERATION METHOD BY IMAGE FORMING APPARATUS, AND SYSTEM This application is based on Japanese Patent Application No. 2013-099258 filed with the Japan Patent Office on May 9, 2013, the entire content of which is hereby incorporated by reference.

BACKGROUND OF THE INVENTION

1. Field of the Invention

This invention relates to control of an image forming apparatus and more particularly to guidance on a method of operating an image forming apparatus.

2. Description of the Related Art

Some image forming apparatuses which can be connected to a network can make inquiries to a service center through the network. For example, as a user unfamiliar with an operation of an image forming apparatus inquires a service center or a manager at a remote location about an operation method, the manager at the remote location or the service center may use a terminal connected to the network to access the image forming apparatus and provide operation guidance through an operation panel of the image forming apparatus. In this case, the manager or the service center provides explanation of the operation method to the operation panel through the terminal so that the user of the image forming apparatus can subsequently perform a desired operation or function.

For example, Japanese Laid-Open Patent Publication No. 2008-219351 discloses an image forming apparatus facilitating a setting operation.

An image forming apparatus capable of accepting a multi-touch operation shows many screens requiring an operation specific to multi-touch such as zoom-in/zoom-out in image edition, image rotation, page forward of a preview screen, and fine adjustment of a stamp position. An operation screen dedicated for multi-touch is also shown. A technique for such a remote panel system that an image forming apparatus having an operation panel and a tablet terminal are connected to each other through a network and various operations of the image forming apparatus are performed through the tablet terminal is also available. With this technique, a tablet terminal on which a user can perform a multi-touch operation can be used to remotely access an image forming apparatus and make an inquiry to a service center.

In some cases, a service center cannot introduce an information terminal capable of accepting a multi-touch input or an introduced information terminal capable of accepting a multi-touch input cannot be used for such reasons as cost saving or other situations. Even in such a case, the service center has to respond to inquiries from users of image forming apparatuses.

According to the technique disclosed in Japanese Laid-Open Patent Publication No. 2008-219351, an operation screen of the image forming apparatus can be converted in accordance with a set value and the resultant screen can be displayed on an information terminal. Inquiries from users, however, cannot be responded to.

Therefore, it is required to provide an operation method to a user unfamiliar with a multi-touch operation. In addition, even though an information terminal in a service center is a terminal not having a multi-touch function, guidance on an operation method as allowing the user himself/herself to perform an operation has to be provided to a user of an image forming apparatus.

SUMMARY OF THE INVENTION

This disclosure was made to solve the problems as described above, and an object in one aspect is to provide an image forming apparatus capable of providing an operation method to a user unfamiliar with a multi-touch operation. An object in another aspect is to provide an image forming apparatus capable of providing to a user of an image forming apparatus, guidance on an operation method as allowing the user himself/herself to perform an operation even though an information terminal in a service center is a terminal not having a multi-touch function.

An object in another aspect is to provide a method for providing guidance on an operation method by an image forming apparatus to a user unfamiliar with a multi-touch operation. An object in another aspect is to provide a method for providing guidance on an operation method by an image forming apparatus to a user even though an information terminal in a service center is a terminal not having a multi-touch function.

An object in another aspect is to provide a program for allowing an image forming apparatus to realize the method above. An object in yet another aspect is to provide a system including the image forming apparatus as above and an information terminal.

In order to achieve the object above, according to one aspect of the present invention, an image forming apparatus includes a communication portion for communicating with an information terminal through a network, a monitor including a touch panel capable of accepting a multi-touch operation, for displaying an operation screen of the image forming apparatus, and a controller for controlling an operation of the image forming apparatus. The controller is configured to (i) transmit an inquiry signal about an operation method using the operation screen displayed on the monitor to the information terminal, (ii) receive operation method instruction information including information transmitted by the information terminal based on the inquiry signal for indicating the multi-touch operation, and (iii) cause the monitor to display the operation screen and an operation instruction based on the operation method instruction information.

According to another aspect of the present invention, an image forming apparatus includes a monitor including a touch panel capable of accepting a multi-touch operation, for displaying an operation screen of the image forming apparatus, a first communication interface for communicating with an information terminal, a second communication interface for communicating with an image display terminal having a touch panel, and a controller for controlling an operation of the image forming apparatus. The controller is configured to (i) transmit the operation screen to the image display terminal, (ii) receive an inquiry signal sent from the image display terminal for making an inquiry about an operation method using the operation screen, (iii) transmit the inquiry signal to the information terminal, (iv) combine operation method instruction information including information transmitted by the information terminal based on the inquiry signal for indicating the multi-touch operation with the operation screen, and (v) transmit a signal resulting from combination to the image display terminal.

According to yet another aspect of the present invention, a method for guidance on an operation method by an image forming apparatus having a monitor including a touch panel capable of accepting a multi-touch operation includes the steps of communicating with an information terminal through a network, displaying an operation screen of the image forming apparatus on a monitor, and controlling an operation of the image forming apparatus. The controlling step includes (i) transmitting an inquiry signal about an operation method using an operation screen displayed on the monitor to the information terminal, (ii) receiving operation method instruction information including information transmitted by the information terminal based on the inquiry signal for indicating the multi-touch operation, and (iii) causing the monitor to display the operation screen and an operation instruction based on the operation method instruction information.

According to yet another aspect of the present invention, a method for guidance on an operation method by an image forming apparatus having a monitor including a touch panel capable of accepting a multi-touch operation includes the steps of displaying an operation screen of the image forming apparatus, communicating with an information terminal, communicating with an image display terminal having a touch panel, and controlling an operation of the image forming apparatus. The controlling step includes (i) transmitting the operation screen to the image display terminal, (ii) receiving an inquiry signal sent from the image display terminal for making an inquiry about an operation method using the operation screen, (iii) transmitting the inquiry signal to the information terminal, (iv) combining operation method instruction information including information transmitted by the information terminal based on the inquiry signal for indicating the multi-touch operation with the operation screen, and (v) transmitting a signal resulting from combination to the image display terminal.

According to yet another aspect of the present invention, a non-transitory computer-readable storage medium stores a program for causing a controller of an image forming apparatus. The program causes the controller to perform the above steps.

According to yet another aspect of the present invention, a system includes an image forming apparatus and an information terminal capable of communicating with the image forming apparatus through a network. The image forming apparatus includes a communication portion for communicating with an information terminal, a monitor including a touch panel capable of accepting a multi-touch operation, for displaying an operation screen of the image forming apparatus, and a controller for controlling an operation of the image forming apparatus. The controller is configured to (i) transmit an inquiry signal about an operation method using the operation screen displayed on the monitor to the information terminal through the communication portion, (ii) receive through the communication portion, operation method instruction information including information transmitted by the information terminal based on the inquiry signal for indicating the multi-touch operation, and (iii) cause the monitor to display the operation screen and an operation instruction based on the operation method instruction information.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
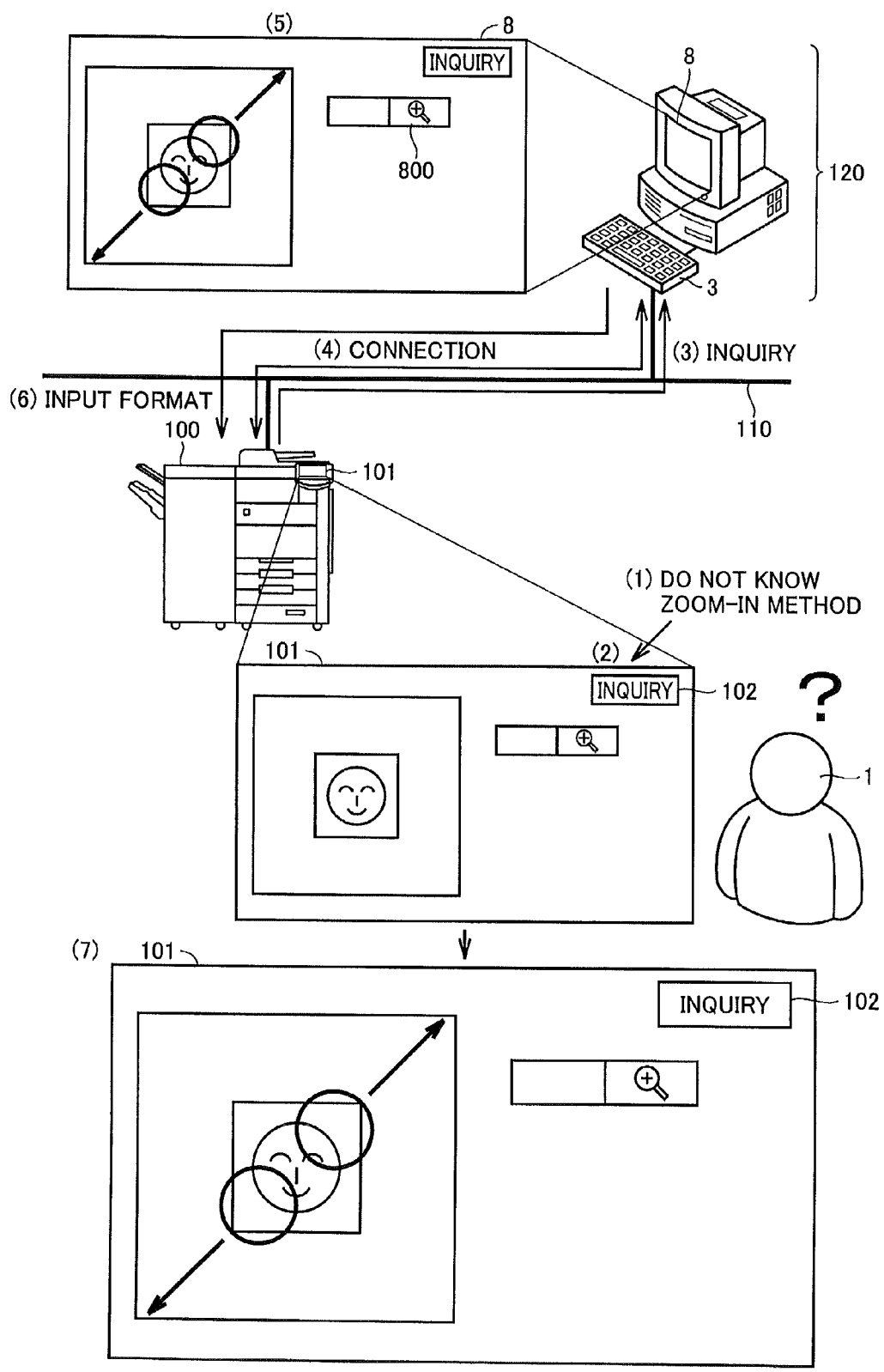
FIG. 1 is a diagram representing a manner of connection between an image forming apparatus (also referred to as an MFP (Multi-Function Peripheral)) and a terminal.

An embodiment of the present invention will be described hereinafter with reference to the drawings. In the description below, the same elements have the same reference characters allotted. Their label and function are also identical. Therefore, detailed description thereof will not be repeated.

[Technical Concept]

A technical concept according to the present embodiment will be described with reference to FIG. 1. FIG. 1 is a diagram representing a manner of connection between an image forming apparatus (MPP) 100 and a terminal 120.

Image forming apparatus 100 and terminal 120 are connected to a network 110. Network 110 is more specifically an intranet, the Internet, or the like. A manner of connection may be any of wired connection and wireless connection.

Image forming apparatus 100 includes a touch panel 101. Touch panel 101 is implemented, for example, by a monitor capable of accepting a multi-touch operation.

(Stage 1) In one aspect, a user of image forming apparatus 100 may not know an operation (such as a zoom-in method) of image forming apparatus 100 even when he/she looks at contents displayed on touch panel 101.

(Stage 2) The user performs a touch operation on an icon 102 displayed on touch panel 101, which accepts an operation for making an inquiry. More specifically, an operation for making an inquiry is, for example, as follows. (Example 1) When a user touches icon 102, a menu screen is displayed. The user selects contents of an inquiry (such as "zoom-in") from the menu screen. The user provides an input entering inquiry contents in the menu screen. (Example 2) Image forming apparatus 100 displays on touch panel 101, a character input screen for accepting an inquiry about an operation method. The user inputs inquiry contents ("zoom-in") through the character input screen. (Example 3) In a case that image forming apparatus 100 has a voice recognition function, as the user touches icon 102, image forming apparatus 100 displays a screen inviting utterance and accepts sound input from the user. When the user utters inquiry contents (such as "zoom-in"), image forming apparatus 100 specifies inquiry contents as "zoom-in" based on the sound.

(Stage 3) In response to the touch operation onto icon 102, image forming apparatus 100 inquires terminal 120 about a specific operation of the screen (in this example, a zoom-in method) displayed on touch panel 101. For example, image forming apparatus 100 transmits to terminal 120, a signal including an identification number of image forming apparatus 100, an identification number of the screen displayed on touch panel 101, and contents of an inquiry specifically designated by icon 102.

(Stage 4) Terminal 120 includes a keyboard 3 and a monitor 8. When terminal 120 receives an inquiry sent from image forming apparatus 100, it establishes connection with image forming apparatus 100. More specifically, terminal 120 establishes a communication session with image forming apparatus 100 for notification of a method of operating image forming apparatus 100.

(Stage 5) In terminal 120, monitor 8 displays a screen similar to the screen displayed on touch panel 101 of image forming apparatus 100 based on a signal sent from image forming apparatus 100. An operator of terminal 120 views the screen and gives terminal 120 an answer about the operation method demanded from image forming apparatus 100. When the operator gives the answer to the inquiry to terminal 120, terminal 120 transmits a signal including a format of input to touch panel 101 to image forming apparatus 100.

(Stage 6) Image forming apparatus 100 checks an input format of touch panel 101 and an input format in terminal 120. When the input format of touch panel 101 and the input format in terminal 120 are both a format capable of accepting a multi-touch operation, image forming apparatus 100 superimposes operation method instruction information included in a signal sent from terminal 120 on touch panel 101. When the input formats are different, image forming apparatus 100 converts operation method instruction information provided by the operator based on the input format of terminal 120 so as to conform to the input format of touch panel 101. This conversion is made, for example, based on a table associating each key in keyboard 3 of terminal 120 with the operation method of the monitor capable of accepting a multi-touch operation. This table is held in advance in image forming apparatus 100. In another aspect, when the terminal has such a table, terminal 120 may carry out this conversion.

(Stage 7) Image forming apparatus 100 displays as operation method instruction information, for example, a line provided with a circle or an arrow on touch panel 101.

[Configuration of Image Forming Apparatus]

Figure 2:
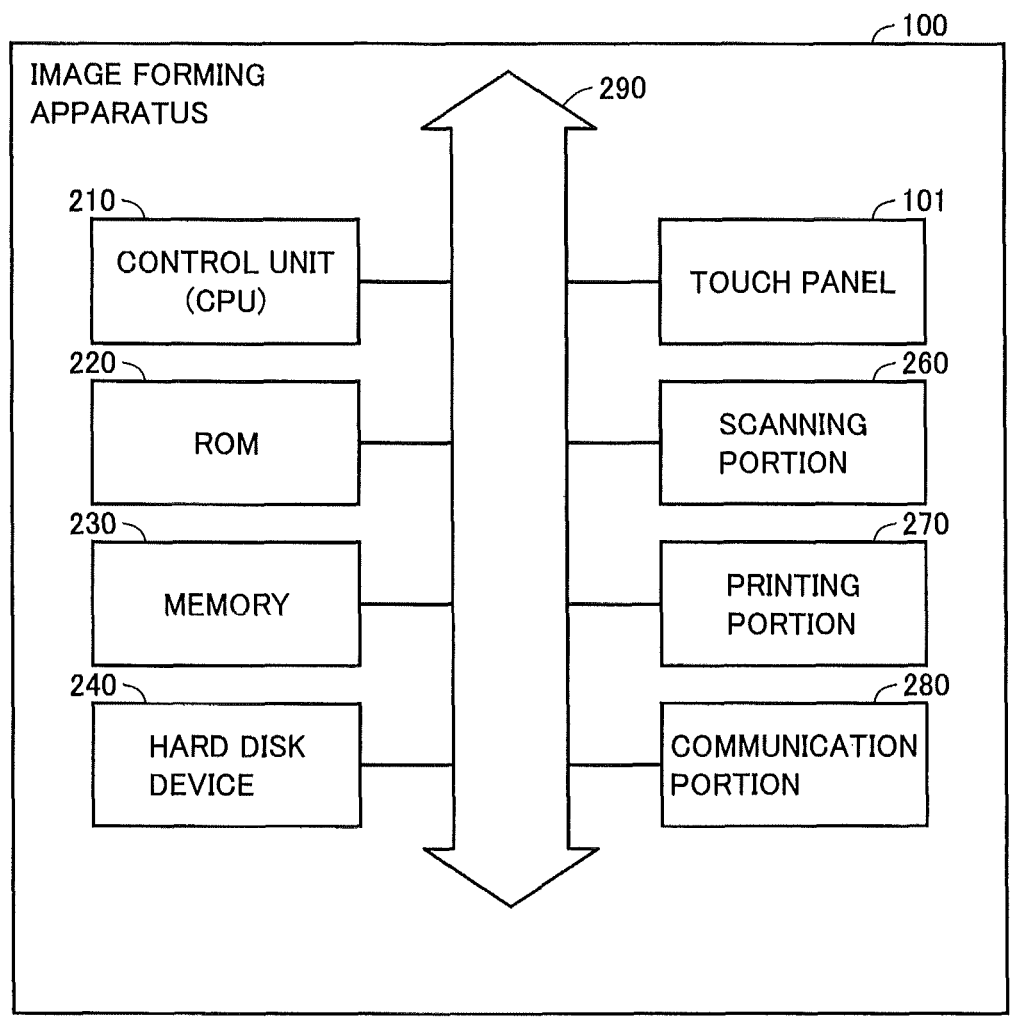
FIG. 2 is a block diagram representing a hardware configuration of the image forming apparatus.

A configuration of image forming apparatus 100 according to the present embodiment will be described with reference to FIG. 2. FIG. 2 is a block diagram representing a hardware configuration of image forming apparatus 100. Image forming apparatus 100 includes touch panel 101, a control unit 210, a ROM (Read-Only Memory) 220, a memory 230, a hard disk device 240, a scanning portion 260, a printing portion 270, and a communication portion 280. These components are each connected to a signal line 290.

Control unit 210 controls an operation of image forming apparatus 100. Control unit 210 includes, for example, a CPU (Central Processing Unit) and other processors. In this case, control unit 210 executes a program stored in image forming apparatus 100 to thereby cause image forming apparatus 100 to perform a predetermined operation. In another aspect, control unit 210 may be implemented by one or more circuit elements for realizing each operation.

ROM 220 stores a program and data for causing image forming apparatus 100 to perform an operation defined in advance.

Memory 230 temporarily holds data generated through an operation of image forming apparatus 100. Hard disk device 240 also holds in a non-volatile manner, data generated through an operation of image forming apparatus 100 or data externally provided to image forming apparatus 100.

Touch panel 101 accepts an input of an operation by a user onto image forming apparatus 100 and sends a signal in accordance with the operation to control unit 210.

Scanning portion 260 scans a document provided to image forming apparatus 100 and other objects, and sends scanned data to memory 230.

Printing portion 270 prints an image onto paper and other media based on data held in memory 230 or data obtained by scanning portion 260. In another aspect, printing portion 270 may transmit data to another apparatus in a file and another format instead of forming an image on paper and other media.

Communication portion 280 communicates with another information communication apparatus connected to image forming apparatus 100 (such as terminal 120 or a client terminal (not shown) used by a user of image forming apparatus 100) under the control by control unit 210. Communicated data includes data generated by printing portion 270 or a command to execute printing and another job sent from a client terminal.

(Functional Configuration)

In one aspect, communication portion 280 communicates with terminal 120 through network 110. Touch panel 101 can accept a multi-touch operation. Touch panel 101 displays an operation screen of image forming apparatus 100 and accepts an operation on image forming apparatus 100. Control unit 210 is configured to transmit an inquiry signal about an operation method using the operation screen displayed on touch panel 101 to terminal 120 through communication portion 280, receive through communication portion 280, operation method instruction information transmitted by terminal 120 in response to the inquiry signal, and cause touch panel 101 to display the operation screen and the operation method instruction information. The operation method instruction information includes information for indicating a multi-touch operation.

Preferably, the inquiry signal includes apparatus identification information for identifying image forming apparatus 100, screen identification information for identifying an operation screen, and inquiry contents.

Preferably, when a command for zoom-in of the screen (a preview screen) displayed on touch panel 101 is given twice from terminal 120 to image forming apparatus 100, touch panel 101 is configured to increase, by magnitude defined in advance, a zoom-in factor of the screen in response to a second command, as compared with a zoom-in factor of the screen in response to a first command. The command for zoom-in includes, for example, an operation to press any key in the keyboard of terminal 120. When an operator of terminal 120 presses the key successively twice, terminal 120 transmits twice the zoom-in command to image forming apparatus 100.

Preferably, when a command for zoom-in of the screen displayed on touch panel 101 is given from terminal 120 to image forming apparatus 100 and successively a zoom-out command is given to image forming apparatus 100, touch panel 101 is configured to zoom in the screen based on the zoom-in command and zoom out the screen by using a zoom-out factor smaller by a prescribed ratio than a ratio defined in advance based on the zoom-out command.

Preferably, when a command for switching display contents in a list is given twice from terminal 120 to image forming apparatus 100 while touch panel 101 displays a list showing a plurality of items in the list, touch panel 101 is configured to switch contents in the list for display by increasing, by a number defined in advance, the number of switched items in display contents based on a second command following a first command, as compared with the number of switched items based on the first command.

Preferably, when an inquiry about the operation method includes an inquiry about zoom-in of the screen, the operation method instruction information indicates a method for pinch-out of the screen displayed on touch panel 101.

Preferably, when an inquiry about the operation method includes an inquiry about zoom-out of the screen, the operation method instruction information indicates a method for pinch-in of the screen displayed on touch panel 101.

Preferably, when an inquiry about the operation method includes an inquiry about rotation of the screen, the operation method instruction information indicates a method for rotating the screen displayed on touch panel 101.

Preferably, when an inquiry about the operation method includes an inquiry about scroll, the operation method instruction information indicates a method for scrolling the screen displayed on touch panel 101.

Preferably, terminal 120 includes a keyboard. Control unit 210 is configured to display as the operation method instruction information, operation method instruction information on touch panel 101 by associating a key included in the keyboard and a touch operation on the operation screen of touch panel 101 with each other.

Preferably, the operation method instruction information includes any of a still image and a moving image. The still image is, for example, an image representing two fingers arranged in correspondence with a touch operation. The moving image is an image having fingers performing a touch operation arranged and representing transition of states of switch of the screen in response to the touch operation as animation.

[Structure of Terminal]

Figure 3:
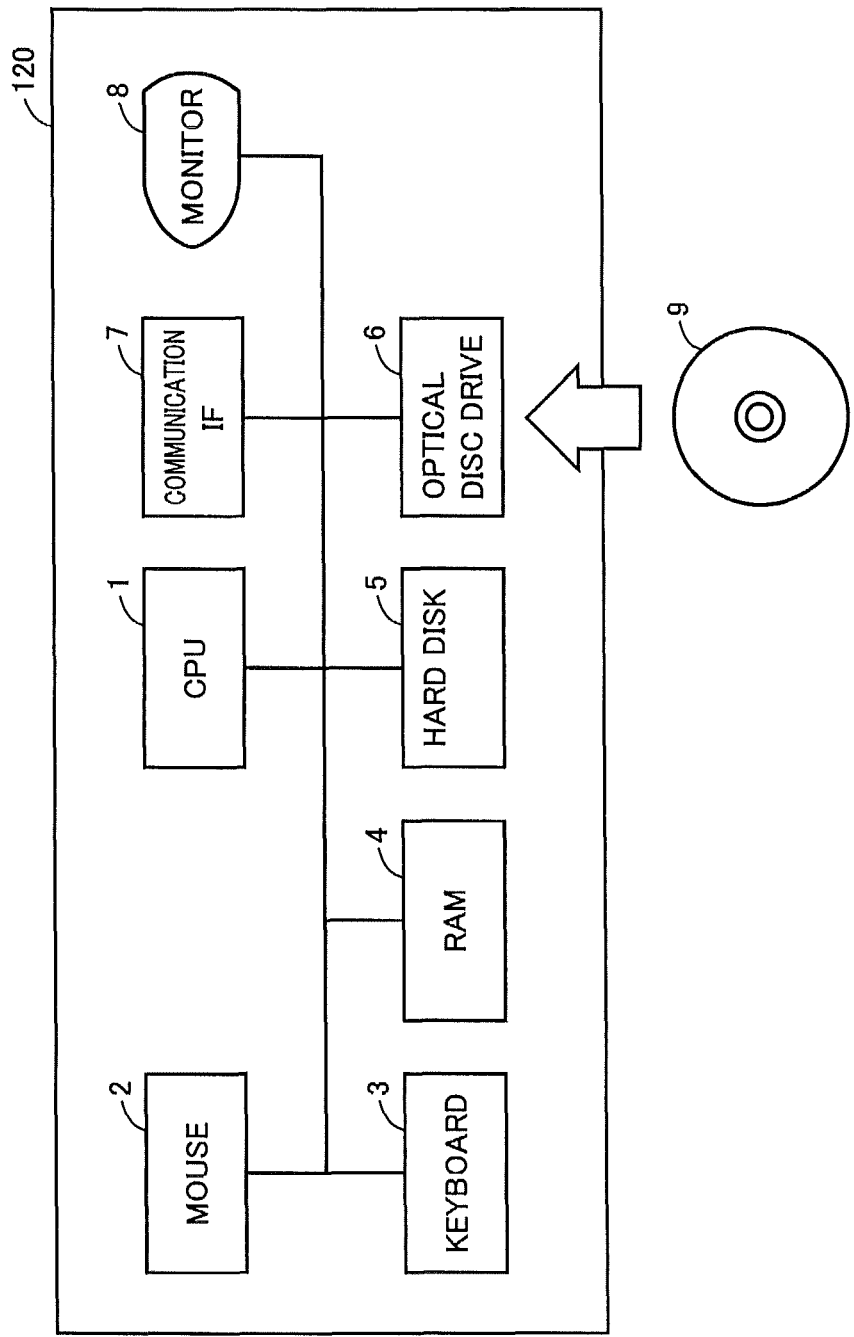
FIG. 3 is a block diagram representing a hardware configuration of the terminal.

A configuration of terminal 120 according to the present embodiment will be described with reference to FIG. 3. FIG. 3 is a block diagram representing a hardware configuration of terminal 120.

Terminal 120 includes as main components, a CPU (Central Processing Unit) 1 to execute a program, a mouse 2 and keyboard 3 receiving input of an instruction from a user of terminal 120, a RAM 4 storing in a volatile manner, data generated as a result of execution of a program by CPU 1 or data input through mouse 2 or keyboard 3, a hard disk 5 storing data in a non-volatile manner, an optical disc drive 6, monitor 8, and a communication IF (interface) 7. The components are connected to one another through a bus. A CD-ROM 9 and other optical discs are attached to optical disc drive 6. Though communication IF 7 includes a USB (Universal Serial Bus) interface, wired LAN (Local Area Network), wireless LAN, and a Bluetooth (trademark) interface, it is not limited thereto.

Processing in terminal 120 is realized by each piece of hardware and software executed by CPU 1. Such software may be stored in advance in hard disk 5. Alternatively, software may also be stored in CD-ROM 9 and other computer readable non-volatile data recording media and distributed as a program product. Alternatively, software may also be provided as a downloadable program product by an information provider connected to the Internet and other networks. Such software is read from a data recording medium by optical disc drive 6 and other data readers or downloaded through communication IF 7 and thereafter stored once in hard disk 5. That software is read from hard disk 5 by CPU 1 and stored in RAM 4 in a format of an executable program. CPU 1 executes that program.

A hardware configuration of terminal 120 is common and an operation of the hardware is also well-known. Therefore, detailed description of hardware will not be repeated.

It is noted that a data recording medium is not limited to a CD-ROM, an FD (Flexible Disk), and a hard disk, and a non-volatile data recording medium carrying a program in a fixed manner such as a magnetic tape, a cassette tape, an optical disc (an MO (Magnetic Optical disc)/an MD (Mini Disc)/a DVD (Digital Versatile Disc), a BD (Blu-Ray), an IC (Integrated Circuit) card (including memory cards), an optical card, and semiconductor memories including a mask ROM, an EPROM (Electronically Programmable Read-Only Memory), an EEPROM (Electronically Erasable Programmable Read-Only Memory), and a flash memory may be applicable.

The program herein includes not only a program directly executable by the CPU but also a program in a form of a source program, a compressed program, and an encrypted program.

[Control Structure]

Figure 4:
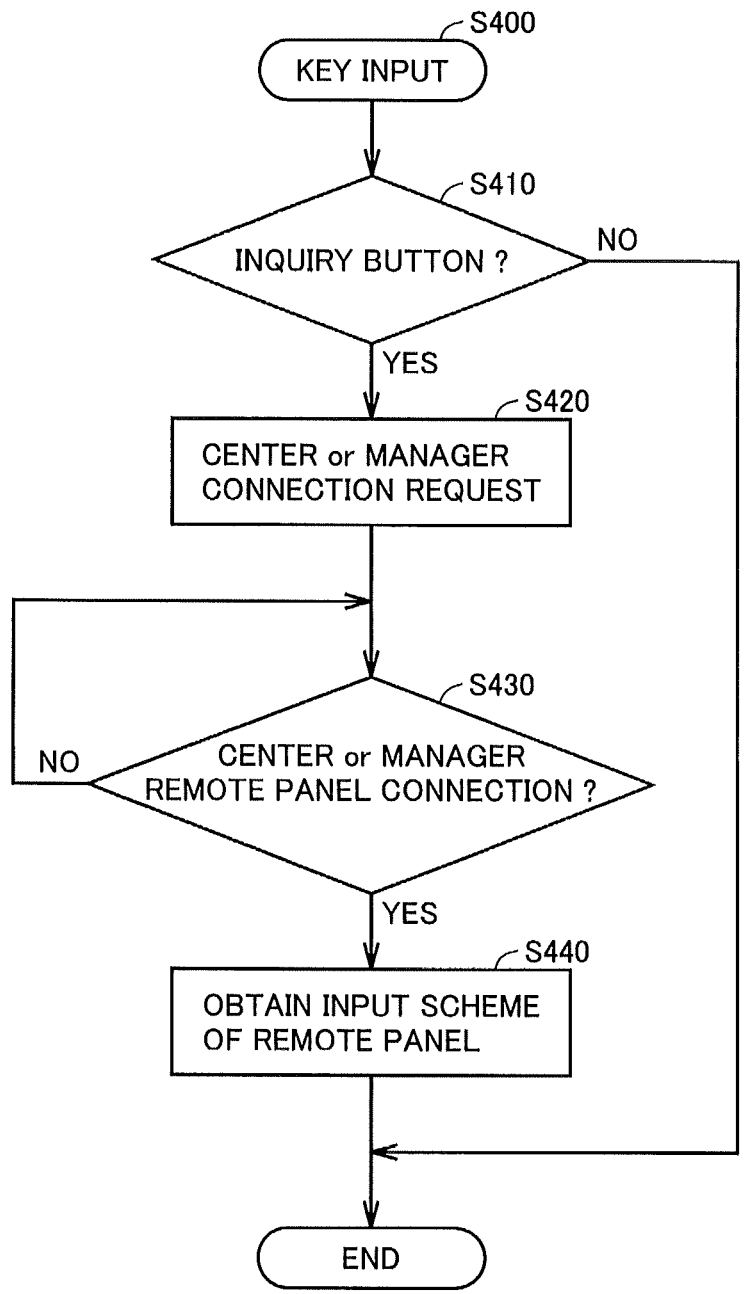
FIG. 4 is a flowchart representing a part of processing performed by a control unit of the image forming apparatus.

A control structure of image forming apparatus 100 according to the present embodiment will be described with reference to FIG. 4. FIG. 4 is a flowchart representing a part of processing performed by control unit 210 of image forming apparatus 100.

In step S410, control unit 210 determines whether or not an inquiry button (for example, icon 102) has been pressed based on an operation of touch panel 101. When control unit 210 determines that the inquiry button has been pressed (YES in step S410), it switches control to step S420. Otherwise (NO in step S410), control unit 210 ends the process.

In step S420, control unit 210 detects a request for connection to a service center or a manager based on pressing of the inquiry button. Control unit 210 detects contents of an inquiry about a method of operating image forming apparatus 100 (for example, "zoom-in") based on an input from a user of image forming apparatus 100.

In step S430, control unit 210 determines whether or not connection between image forming apparatus 100 and a remote panel (terminal 120) used by the service center or the manager has been established. When control unit 210 determines that connection has been established (YES in step S430), it switches control to step S440. Otherwise (NO in step S430), control unit 210 stands by for a set certain period of time and thereafter returns control to step S430.

In step S440, control unit 210 establishes communication with terminal 120 and obtains an input scheme of the monitor of terminal 120 based on a signal received from terminal 120.

Figure 5:
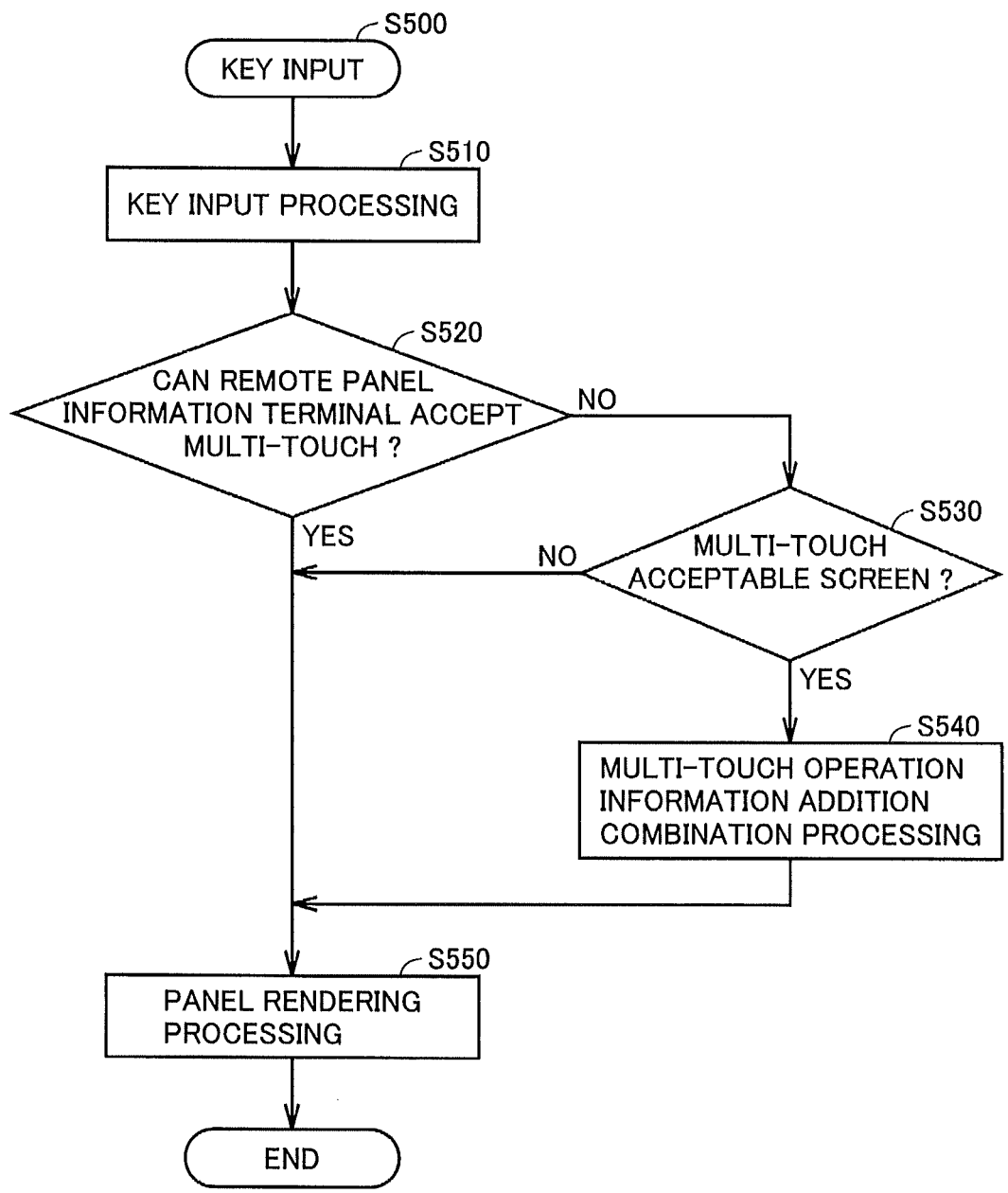
FIG. 5 is a flowchart representing a part of panel rendering processing performed by the image forming apparatus.

The control structure of image forming apparatus 100 will further be described with reference to FIG. 5. FIG. 5 is a flowchart representing a part of panel rendering processing performed by image forming apparatus 100.

In step S510, control unit 210 senses key input processing in terminal 120 based on a signal received through communication portion 280.

In step S520, control unit 210 determines whether or not monitor 8 of terminal 120 is a monitor capable of accepting a multi-touch operation based on a signal sent from terminal 120. When control unit 210 determines that monitor 8 is a monitor capable of accepting a multi-touch operation (YES in step S520), it switches control to step S550. Otherwise (NO in step S520), control unit 210 switches control to step S530.

In step S530, control unit 210 determines whether or not touch panel 101 is a screen capable of accepting multi-touch. This determination is made, for example, based on data stored in ROM 220. When control unit 210 determines that touch panel 101 is a screen capable of accepting multi-touch (YES in step S530), it switches control to step S540. Otherwise (NO in step S530), control unit 210 switches control to step S550.

In step S540, control unit 210 performs multi-touch operation information addition combination processing. More specifically, control unit 210 combines information sent from terminal 120 to a screen displayed on touch panel 101, that is, operation contents as an answer to contents of the inquiry from the user of image forming apparatus 100. Control unit 210 performs processing for combining these pieces of information and causes touch panel 101 to display guidance information representing operation contents in addition to an initially displayed image.

In step S550, control unit 210 performs panel rendering processing onto touch panel 101. More specifically, in addition to the operation screen representing a state at that time of image forming apparatus 100, an image showing guidance on an operation, of which notification has been given by terminal 120, is displayed.

[Configuration of Signal]

Figure 6:
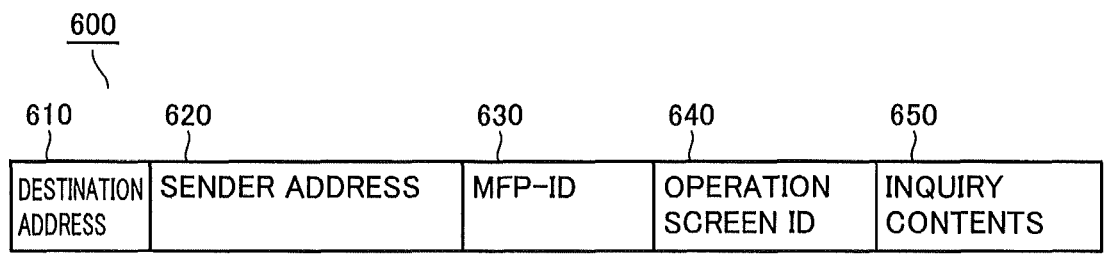
FIG. 6 is a diagram representing outlines of a configuration of a signal sent from the image forming apparatus to the terminal.

A configuration of a signal 600 sent from image forming apparatus 100 to terminal 120 will be described with reference to FIG. 6. FIG. 6 is a diagram representing outlines of a configuration of signal 600. Signal 600 includes a destination address 610, a sender address 620, an MFP-ID 630, an operation screen ID 640, and inquiry contents 650.

Destination address 610 is an address on network 110 of a destination of signal 600, and for example, it is an address of terminal 120. Sender address 620 is an address on network 110 of image forming apparatus 100 which transmits signal 600. MFP-ID 630 includes an identification number of image forming apparatus 100. Operation screen ID 640 includes an identification number of an operation screen displayed on touch panel 101 of image forming apparatus 100.

Inquiry contents 650 include contents inquired of terminal 120 by image forming apparatus 100. More specifically, inquiry contents 650 include an inquiry about a method of operating an operation screen specified by operation screen ID 640.

Figure 7:
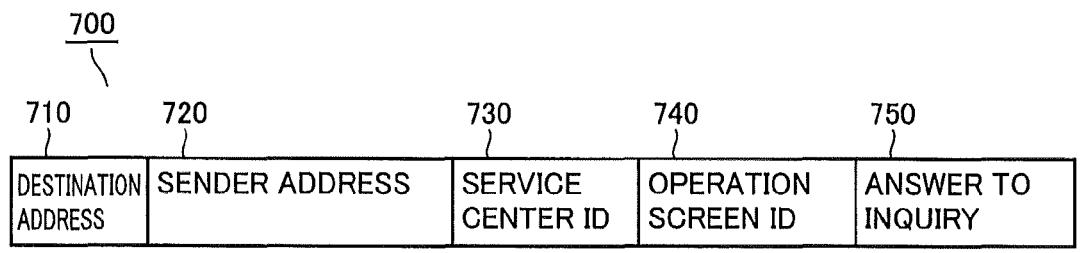
FIG. 7 is a diagram representing outlines of a configuration of a signal sent from the terminal to the image forming apparatus.

A configuration of a signal 700 sent from terminal 120 to image forming apparatus 100 will be described with reference to FIG. 7. FIG. 7 is a diagram representing outlines of a configuration of signal 700. Signal 700 includes a destination address 710, a sender address 720, a service center ID 730, an operation screen ID 740, and an answer to inquiry 750.

Destination address 710 includes a name of terminal 120 which is a sender of signal 700 and a name of a destination of signal 700. Sender address 720 includes an address of image forming apparatus 100 in a network to which terminal 120 is connected. Service center ID 730 includes an identification number as a service center for terminal 120 which transmits signal 700. Operation screen ID 740 identifies an operation screen displayed on image forming apparatus 100.

Answer to inquiry 750 includes an answer to an inquiry about a method of operating a screen displayed on image forming apparatus 100. More specifically, answer to inquiry 750 includes guidance information representing which operation should be performed on a screen displayed on touch panel 101. In one aspect, instead of such an image, answer to inquiry 750 may include an identification number representing guidance information for operating a screen. When signal 700 including such answer to inquiry 750 is transmitted from terminal 120 to image forming apparatus 100, image forming apparatus 100 retrieves guidance information from hard disk device 240 based on that number and causes touch panel 101 to display a result of retrieval as being combined with a screen displayed on touch panel 101. According to such a feature, traffic on the network connecting image forming apparatus 100 and terminal 120 to each other can be decreased.

[Manner of Display on Screen]

(Zoom-In Function)

Figure 8A:
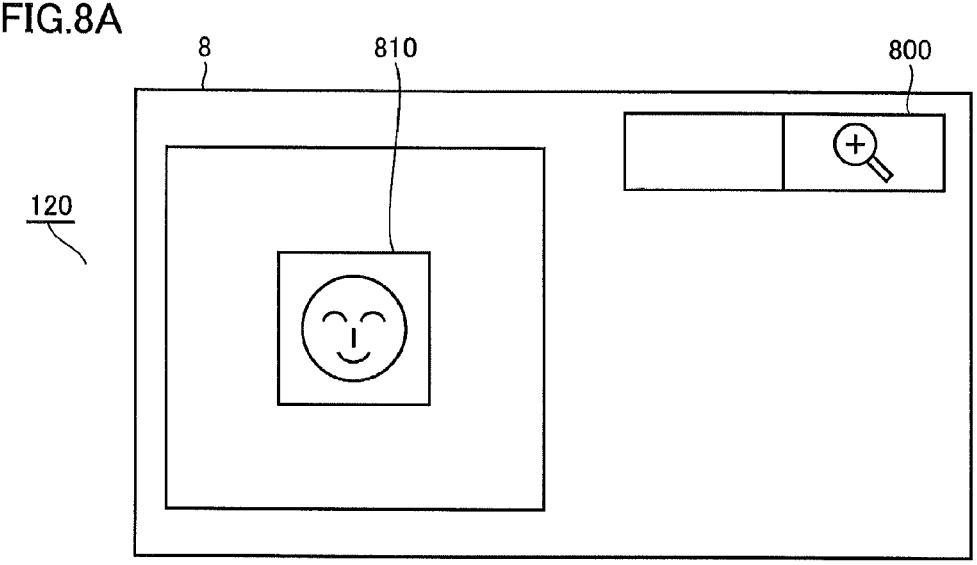
FIGS. 8A to 8C are each a diagram of a display screen on the terminal, illustrating a zoom-in function of the image forming apparatus.
Figure 8B:
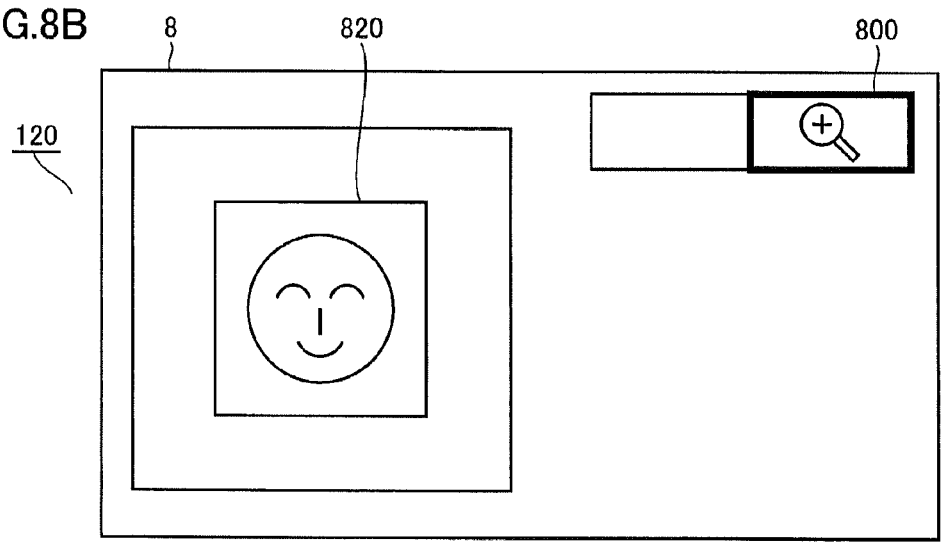
Figure 8C:
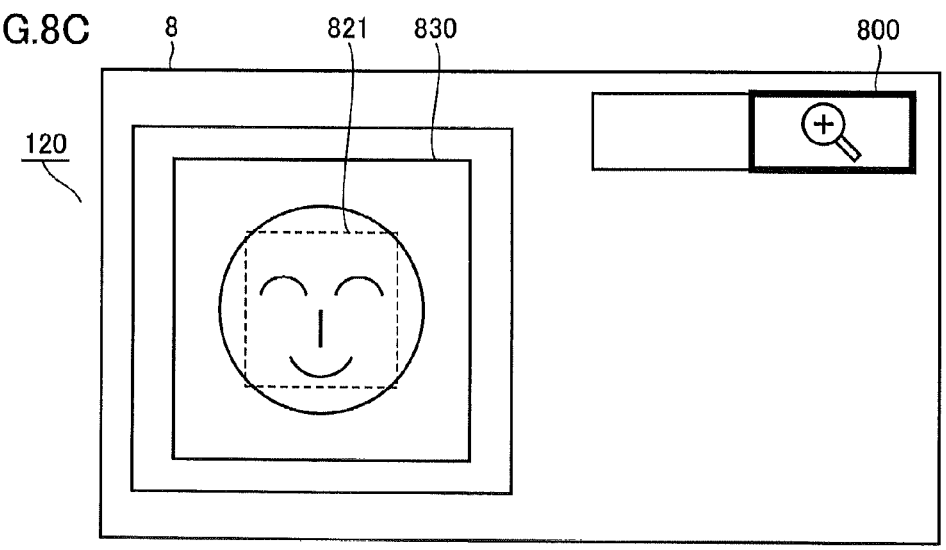
Figure 9A:
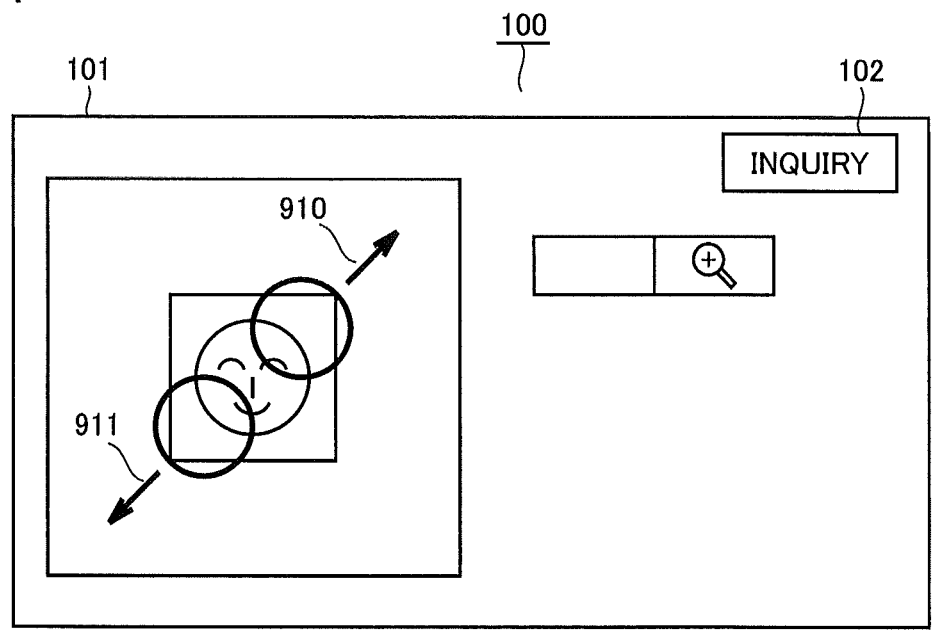
FIGS. 9A and 9B are each a diagram representing operation guidance in a case of zoom-in of an image by using a multi-touch operation.
Figure 9B:
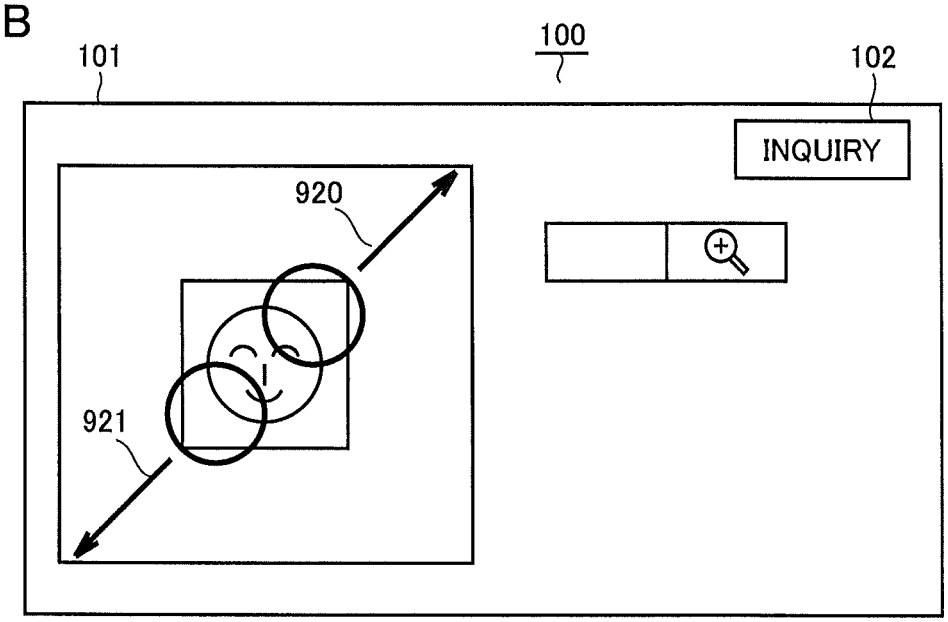

A manner of display on a screen displayed on image forming apparatus 100 based on an operation onto terminal 120 will be described with reference to FIGS. 8A to 8C and 9A and 9B. FIGS. 8A to 8C are each a diagram illustrating a zoom-in function of image forming apparatus 100 and showing a display screen on terminal 120. FIGS. 9A and 9B are each a diagram representing a screen displayed on image forming apparatus 100. In the screen displayed on image forming apparatus 100, a screen the same as a screen displayed on terminal 120 is displayed and icon 102 accepting an inquiry is further displayed.

Outlines of an aspect of zoom-in of an image are as follows. Initially, in one aspect, when a zoom-in button 800 is pressed in terminal 120, as shown in FIGS. 9A and 9B, image forming apparatus 100 displays arrows 910, 911 and 920, 921 for a multi-touch operation, as being added to a displayed screen. In another aspect, when zoom-in button 800 is pressed in terminal 120, image forming apparatus 100 displays a displayed screen as being zoomed in. In yet another aspect, a length of arrows 910, 911 and arrows 920, 921 and a zoom-in factor of the screen displayed on image forming apparatus 100 are different between pressing once and pressing twice of zoom-in button 800.

More specifically, in one aspect, as shown in FIG. 8A, monitor 8 of terminal 120 displays an image 810 to be zoomed in and zoom-in button 800. Zoom-in button 800 is associated with a zoom-in key of keyboard 3. When a user of image forming apparatus 100 does not know a method of zoom-in of an image displayed on touch panel 101, the user presses icon 102 for making an inquiry, so as to start communication between image forming apparatus 100 and terminal 120. When image forming apparatus 100 inquires terminal 120 about a method of operating a screen based on pressing by the user, a screen representing contents of the inquiry is displayed on monitor 8. When an operator performs an operation for showing an answer to the inquiry onto terminal 120, terminal 120 transmits the answer to the inquiry to image forming apparatus 100.

For example, when terminal 120 receives an inquiry from image forming apparatus 100, an operator presses a key brought in correspondence with zoom-in button 800 (for example, a "+" key in keyboard 3). In a case that monitor 8 is a common monitor, zoom-in button 800 is merely an image representing a key. In a case that monitor 8 is a touch panel type monitor, zoom-in button 800 functions as an icon accepting an operation.

In one aspect, as shown in FIG. 8B, monitor 8 changes a manner of display of zoom-in button 800. Change in manner of display is represented, for example, by highlighted display of zoom-in button 800, however, limitation to highlighted display is not intended. Terminal 120 transmits a signal representing pressing of the key or zoom-in button 800 to image forming apparatus 100. The signal includes a command for zoomed in display of a screen displayed on touch panel 101 of image forming apparatus 100.

When image forming apparatus 100 receives the signal from terminal 120, it displays arrows 910, 911 representing an operation for zoom-in of the screen on touch panel 101 as shown in FIG. 9A.

As a user of image forming apparatus 100 visually recognizes arrows 910, 911 he/she can readily know a method for zoom-in of the screen. In another aspect, a length of arrows 910, 911 may be longer in accordance with the number of times of pressing of a key brought in correspondence with zoom-in button 800. In a case that a zoom-in factor is defined in advance to be greater in accordance with a length of arrows 910, 911, the user of image forming apparatus 100 can know, by visually recognizing increase in length of arrows 910, 911, that a screen is displayed as being zoomed in, as an interval between fingers in a pinch-out operation onto touch panel 101 is longer.

In yet another aspect, image forming apparatus 100 may zoom in a displayed screen based on pressing of the key or zoom-in button 800 in terminal 120. The operator of terminal 120 can thus specifically indicate an operation method to the user of image forming apparatus 100.

When the operator further presses the key associated with zoom-in button 800 or zoom-in button 800 as shown in FIG. 8C, terminal 120 transmits a signal indicating second pressing of zoom-in button 800 to image forming apparatus 100. When image forming apparatus 100 receives that signal, image forming apparatus 100 displays arrows 920, 921 as a method indicating a zoom-in operation as shown in FIG. 9B. Arrows 920, 921 are longer than arrows 910, 911. The user of image forming apparatus 100 can thus recognize a method of further zoom-in of a screen.

Referring to FIGS. 9A and 9B, image forming apparatus 100 displays on touch panel 101, a screen providing operation guidance in a case of zoom-in of an image with the use of a multi-touch operation.

As shown in FIG. 9A, in one aspect, touch panel 101 displays a screen temporarily held in image forming apparatus 100 (a preview screen). When the user presses icon 102 in order to know an operation method of zoom-in of a screen, image forming apparatus 100 starts communication with terminal 120. When image forming apparatus 100 transmits signal 600 to terminal 120, terminal 120 transmits signal 700 to image forming apparatus 100 as an answer to signal 600. Answer to inquiry 750 of signal 700 includes operation method instruction information representing operation guidance on zoom-in of an image with a touch operation. Touch panel 101 displays arrow 910 as operation method instruction information.

In another aspect, operation method instruction information for zoomed-in display may also be different from a case shown in FIG. 9A. For example, as shown in FIG. 9B, when image forming apparatus 100 senses pressing twice of a key for indicating zoom-in in terminal 120, touch panel 101 displays arrows 920, 921 as operation method instruction information. Here, the key should only be associated with a zoom-in operation and the key is not limited to a specific key. Zoom-in button 800 indicates that any key is associated with a zoom-in operation.

As described above, arrows 920, 921 are longer than arrows 910, 911. A length of the arrows is different depending on a zoom-in factor. For example, in a case of pressing twice, the arrows with a length twice larger may be displayed.

Change in zoom-in factor is not limited to the manner described above. In another aspect, when an operator presses a key or zoom-in button 800, terminal 120 may transmit a signal indicating a factor for zoom-in of a screen to image forming apparatus 100. This factor varies depending on the number of times of pressing of zoom-in button 800. A manner of change in factor may be, for example, a manner of zoom-in of a screen by a constant factor for each pressing or a manner of change in factor for each pressing of zoom-in button 800 (1.2 time→1.5 time→2 times→4 times . . . ). This zoom-in factor is, for example, a factor set in advance in terminal 120 and can be set and changed by an operator of terminal 120 or a manager thereof. In another aspect, a zoom-in factor may be defined in image forming apparatus 100. In this case, terminal 120 transmits a signal indicating pressing to image forming apparatus 100 each time zoom-in button 800 is pressed. Image forming apparatus 100 displays a screen as being zoomed in in accordance with a factor defined in accordance with the number of signals received within a certain predetermined period of time.

(Zoom-In and Zoom-Out of Image)

Figure 10A:
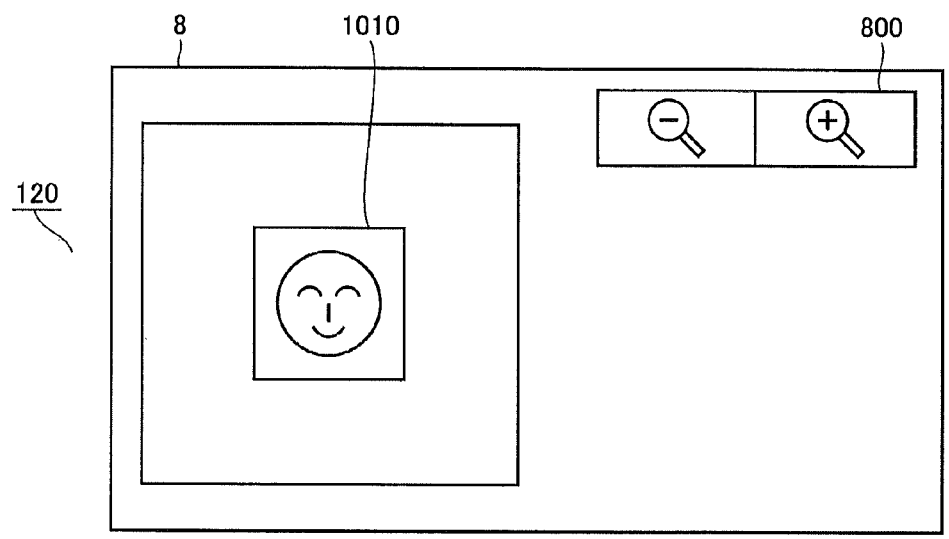
FIGS. 10A to 10C are each a diagram of the display screen on the terminal, representing an operation in a case of zoom-in and subsequent zoom-out of an image displayed on a touch panel.
Figure 10B:
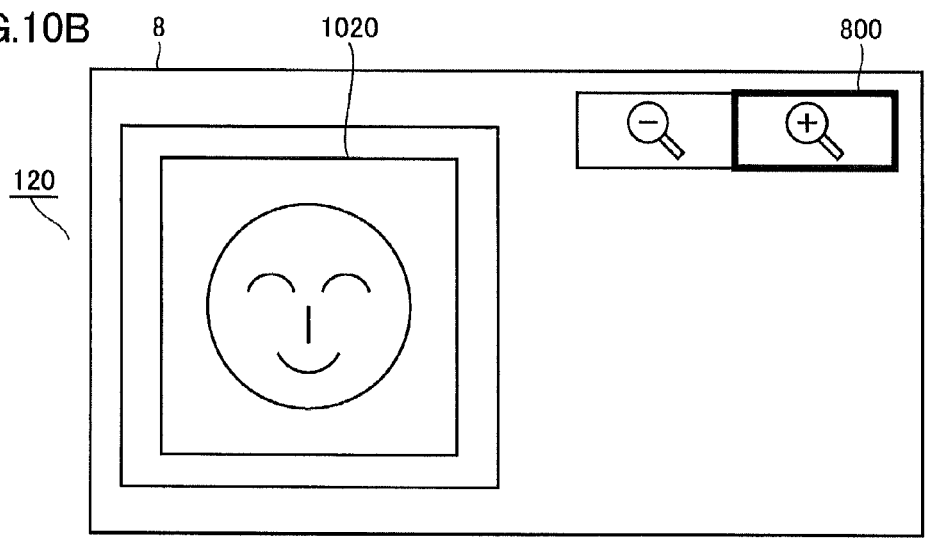
Figure 10C:
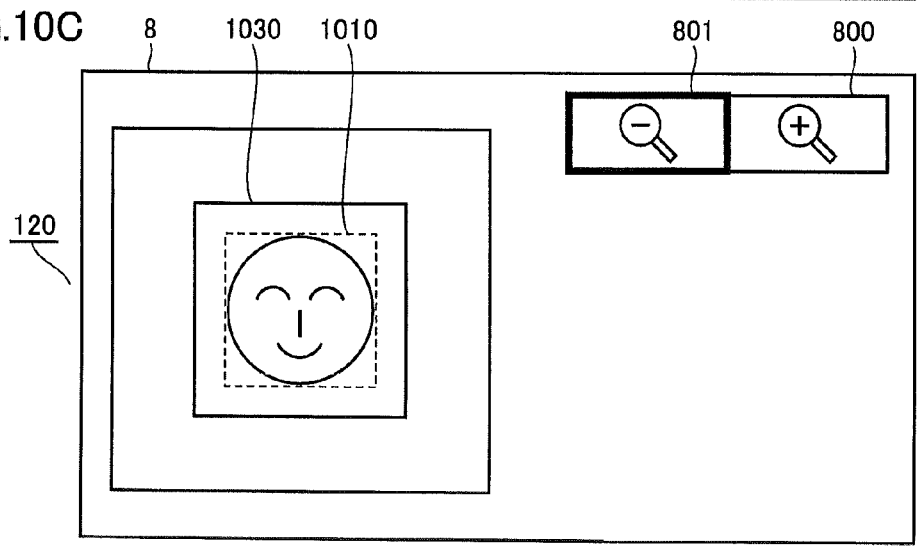
Figure 11A:
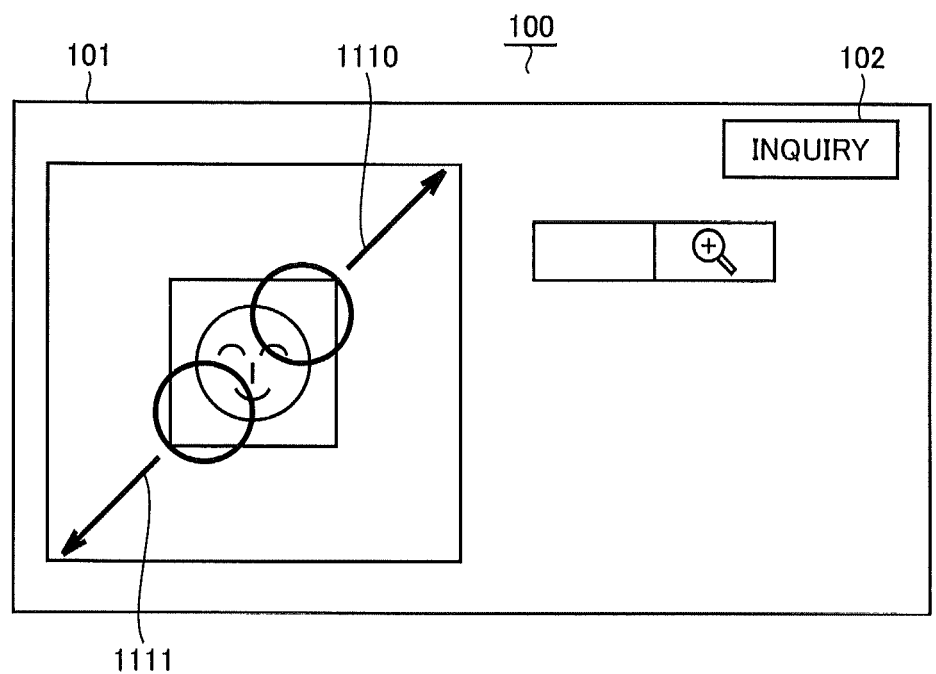
FIGS. 11A and 11B are each a diagram representing an image for guidance on a pinch-out operation of a preview screen.
Figure 11B:
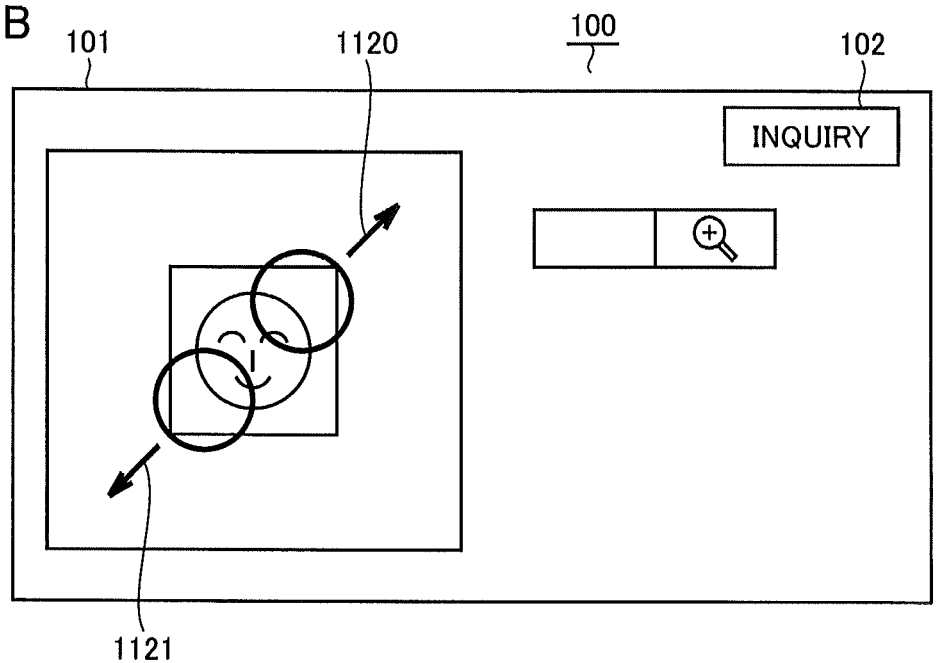

Zoom-in and zoom-out of an image on image forming apparatus 100 will be described with reference to FIGS. 10A to 10C and 11A and 11B. FIGS. 10A to 10C are each a diagram representing a screen displayed on terminal 120, and more specifically a diagram representing an operation in a case of zoom-in and subsequent zoom-out of an image displayed on touch panel 101. FIGS. 11A and 11B are each a diagram representing a screen displayed on image forming apparatus 100, and more specifically a diagram representing a screen for guidance on a pinch-out operation of a preview screen.

Outlines of an aspect of zoom-in and zoom-out of an image are as follows. Initially, in one aspect, when zoom-in button 800 is pressed twice in terminal 120, arrows 1110 and 1111 are displayed as shown in FIG. 11A. When zoom-in button

800 is pressed twice in terminal 120 and successively a zoom-out button 801 is pressed, arrows 1120 and 1121 for a multi-touch operation are displayed on a screen of image forming apparatus 100 as shown in FIG. 11B. Arrows 1120 and 1121 shown in FIG. 11B are longer than the arrows displayed in a case of operation once of zoom-in button 800 (for example, 910 and 911 in FIG. 9A) and shorter than the arrows displayed in a case of operation twice (for example, arrows 920 and 921 in FIG. 9B).

Image forming apparatus 100 can display a screen larger than in a case of zoom-in with operation once and smaller than in a case of zoom-in with operation twice, as a result of operation once of zoom-out button 801 following zoom-in twice by performing an initial operation twice of zoom-in button 800 in terminal 120.

More specifically, referring to FIG. 10A, as shown in FIG. 10A, in one aspect, terminal 120 displays an image 1010 based on data temporarily held in RAM 4 and zoom-in button 800 accepting a zoom-in operation. As described previously, zoom-in button 800 may be any of a hard key and a soft key. When image forming apparatus 100 transmits signal 600 for making an inquiry about an operation to terminal 120, terminal 120 displays on monitor 8, reception of an inquiry from image forming apparatus 100.

As shown in FIG. 10B, when an operator of terminal 120 presses twice zoom-in button 800 as a soft key or any key in keyboard 3 associated with zoom-in button 800 in order to provide guidance on an operation for zoom-in of an image in response to the inquiry, terminal 120 transmits signal 700 to image forming apparatus 100. A manner of display of zoom-in button 800 after pressing and a manner of display before pressing may be different from each other in color or presence of an outer frame.

Here, referring to FIG. 11A, as shown in FIG. 11A, when image forming apparatus 100 receives a signal based on a pressing operation twice of zoom-in button 800 from terminal 120, it displays arrows 1110 and 1111. Arrows 1110 and 1111 are longer than arrows 910 and 911, and for example, a length substantially twice longer is preferred. The user of image forming apparatus 100 can thus readily recognize necessity to perform a pinch-out operation by a length twice longer, in order to achieve two-fold zoom-in.

Referring again to FIG. 10C, as shown in FIG. 10C, when the user of terminal 120 presses zoom-in button 800 twice and thereafter presses zoom-out button 801 once, monitor 8 displays a screen 1030. A size of screen 1030 is, for example, larger than screen 1010 and smaller than a screen 1020. Terminal 120 transmits a signal indicating a zoom-out operation once following a zoom-in operation twice to image forming apparatus 100 as signal 700 indicating an answer about an operation.

Referring to FIG. 11B, as shown in FIG. 11B, when image forming apparatus 100 receives signal 700, it displays arrows 1120 and 1121. As described above, arrows 1120 and 1121 are longer than arrows indicating a zoom-in operation once (for example, arrows 910 and 911) and shorter than arrows indicating a zoom-in operation twice (for example, arrows 1110 and 1111). The user of image forming apparatus 100 can thus readily recognize an operation for zoom-in or zoom-out of an image.

(Pinch-Out of Preview)

An image for guidance on a pinch-out operation of a preview screen will be described with reference to FIGS. 11A and 11B.

As shown in FIG. 11A, in one aspect, touch panel 101 displays arrows 1110 and 1111 as operation method instruction information for suggesting pinch-out. Thereafter, when an inquiry about an operation for zoom-out is made, touch panel 101 displays operation guidance as operation method instruction information 1120 and 1121 as shown in FIG. 11B. The arrows shown in FIG. 11B are shorter than the arrows shown in FIG. 11A. The user of image forming apparatus 100 can thus recognize that an image can be zoomed out in accordance with an amount of movement.

(Switching of List)

Figure 12A:
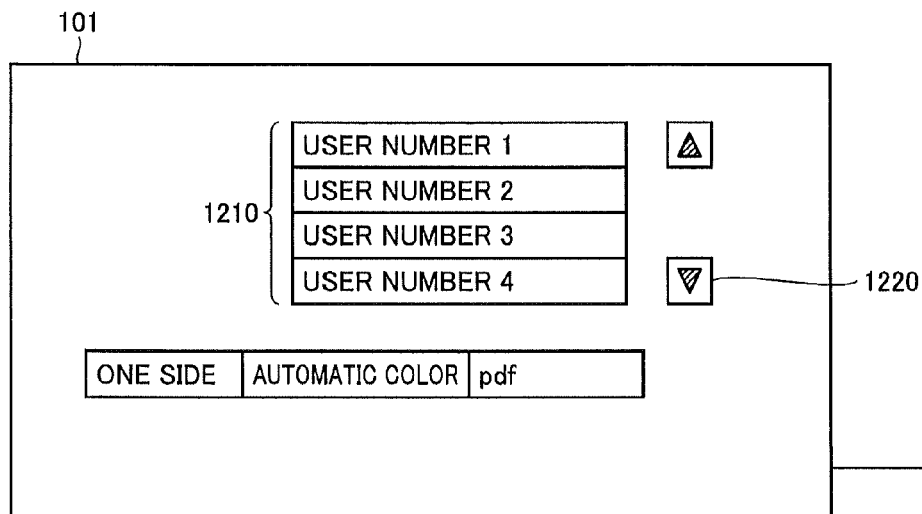
FIGS. 12A to 12C are each a diagram representing transition of a screen on the touch panel of the image forming apparatus.
Figure 12B:
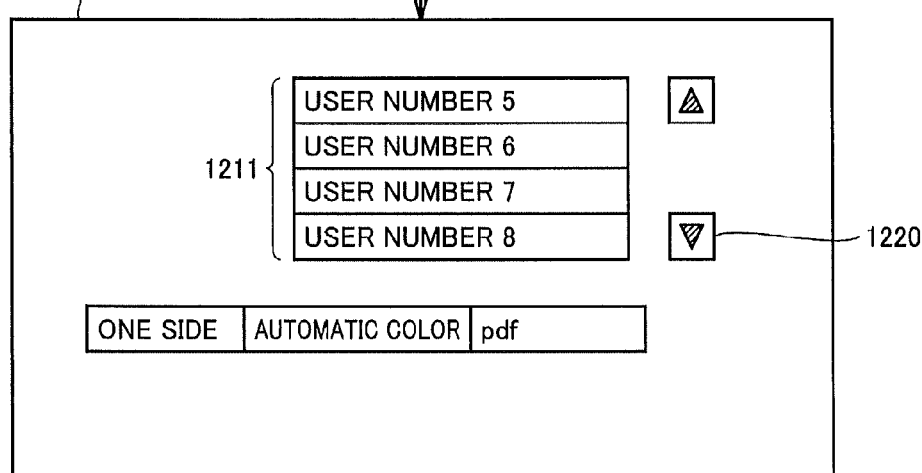
Figure 12C:
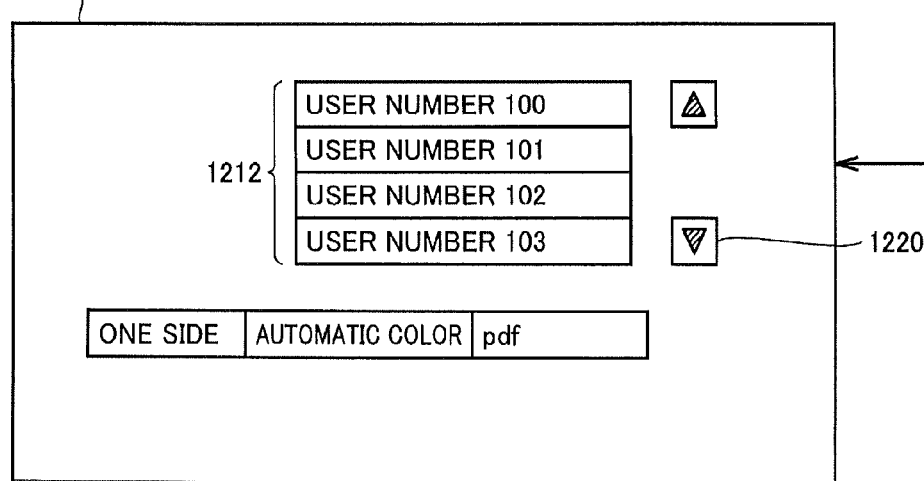

Switching of a list displayed on image forming apparatus 100 will be described with reference to FIGS. 12A to 12C. FIGS. 12A to 12C are each a diagram representing transition of a screen on touch panel 101 of image forming apparatus 100.

As shown in FIG. 12A, in one aspect, touch panel 101 displays a list 1210. In addition, touch panel 101 displays an icon 1220 accepting an operation for switching of a list. Here, a user of image forming apparatus 100 may not know an operation for switching list 1210 displayed on touch panel 101 to a list 1211. In this case, the user presses an inquiry icon (not shown) so as to inquire terminal 120 about an operation method. When an operator of terminal 120 performs a key operation, terminal 120 displays an image as suggesting pressing of icon 1220 (for example, an image of a finger or an arrow pointing to icon 1220) on touch panel 101 as an answer to the inquiry (operation method instruction information) and switches list 1210 to 1211. The user can thus know an operation method for switching contents in a list displayed on touch panel 101.

As shown in FIG. 12B, in another aspect, when the user presses icon 1220, list 1211 is displayed. An item included in list 1211 is continuation of an item included in list 1210. For example, when the user performs an operation in accordance with operation method instruction information displayed on touch panel 101, a displayed list is switched from list 1210 to list 1211.

In another aspect, in FIG. 12A, there may also be a case that the user desires to switch list 1210 displayed on touch panel 101 to a list 1212. In this case, the user presses an inquiry icon (not shown) so as to inquire terminal 120 about an operation method. When the operator of terminal 120 performs a key operation successively twice, terminal 120 displays an image as suggesting press and hold of icon 1220 on touch panel 101 as an answer to the inquiry (operation method instruction information) and switches list 1210 to 1212. The user can thus know an operation method for switching contents in a list displayed on touch panel 101. Unlike an item included in list 1211, an item included in list 1212 is not continuation of an item included in list 1210. Namely, as successive operations by the operator of terminal 120 are provided to icon 1220, image forming apparatus 100 provides scroll display of a list based on an amount of movement greater than a normal amount of movement (the number of items included in a list) for display of contents in the list.

(Pinch-Out)

Figure 13:
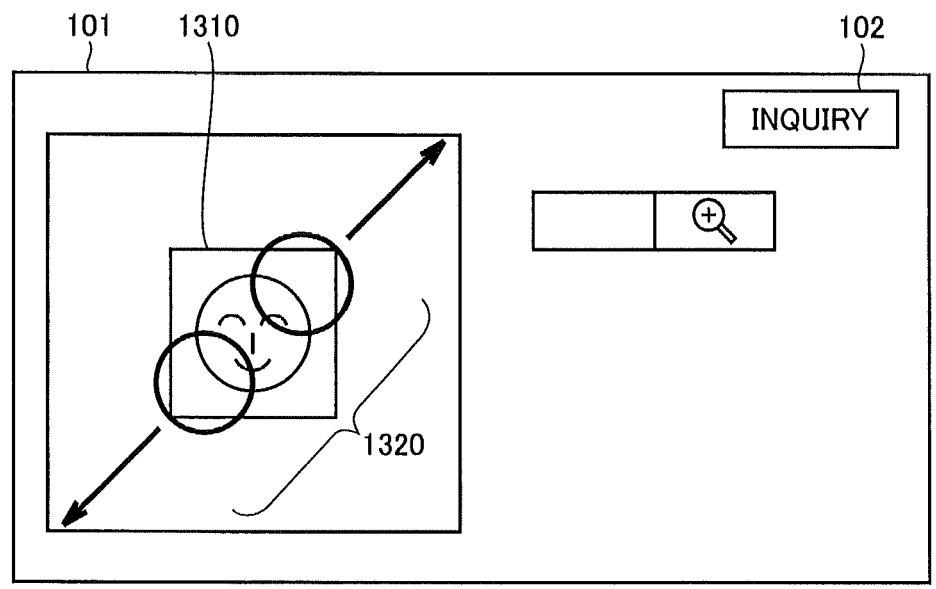
FIG. 13 is a diagram representing operation method instruction information for pinch-out in the image forming apparatus.

One example of operation method instruction information in image forming apparatus 100 will be described with reference to FIGS. 13 and 14. FIG. 13 is a diagram representing operation method instruction information for pinch-out in image forming apparatus 100. More specifically, touch panel 101 displays an image 1320 including circles and arrows which two fingers touch as operation method instruction information. A signal for displaying image 1320 is generated, for example, as the operator of terminal 120 presses a key allocated in advance in keyboard 3 of terminal 120 in a case that an operation mode of terminal 120 is set to a mode teaching a pinch-out operation. The generated signal is sent from terminal 120 to image forming apparatus 100 as operation method instruction information. The user can thus know that zoom-in of an image 1310 can be realized by touching two circles with fingers and moving them outward along arrows.

Figure 14:
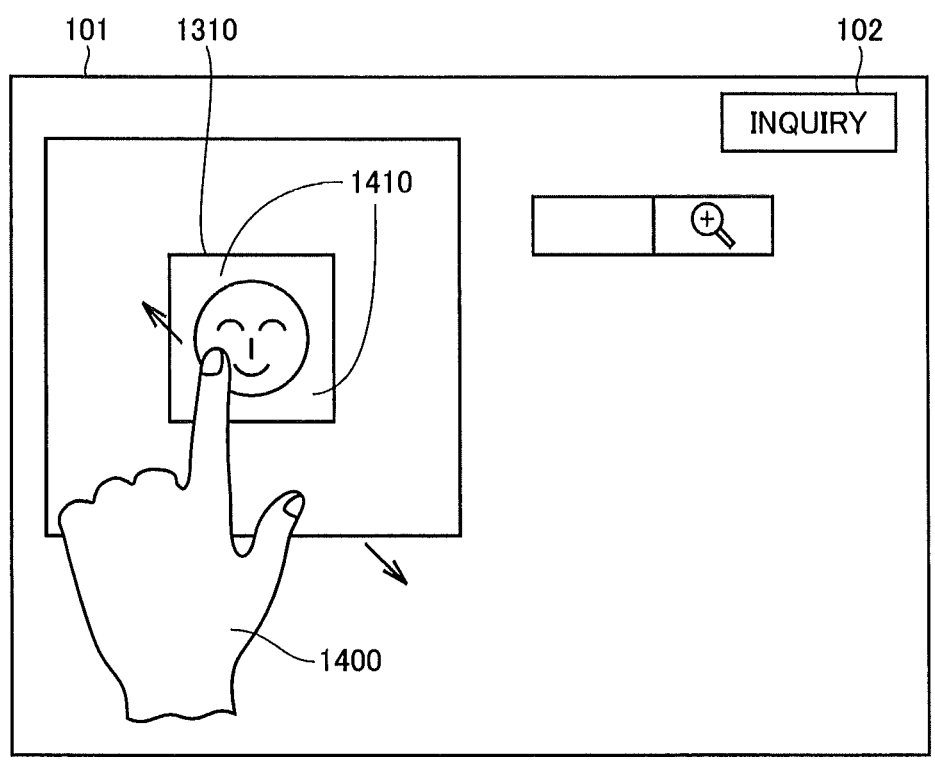
FIG. 14 is a diagram representing another manner for notification of a pinch-out operation.

FIG. 14 is a diagram representing another manner for notification of a pinch-out operation. In another aspect, touch panel 101 may display an image 1400 representing a hand as operation method instruction information. The user can thus recognize necessity of placement of a hand on the touch panel and of expansion outward along arrows for zoom-in of image 1310. A signal for displaying image 1400 and arrows shown in FIG. 14 is also generated as in the case shown in FIG. 13 and transmitted from terminal 120 to image forming apparatus 100. Therefore, further detailed description will not be repeated.

(Pinch-In)

Figure 15:
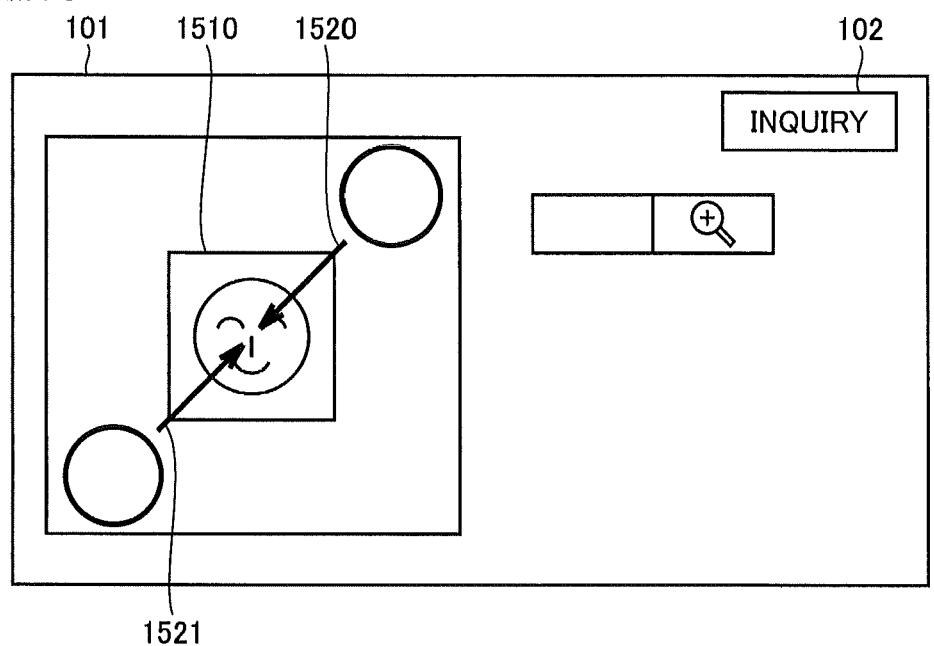
FIG. 15 is a diagram representing one manner of display of a pinch-in operation on the touch panel.

An instruction for a pinch-in operation in image forming apparatus 100 will be described with reference to FIG. 15. FIG. 15 is a diagram representing one manner of display of a pinch-in operation by touch panel 101.

In one aspect, touch panel 101 displays an image 1510. When the user of image forming apparatus 100 operates icon 102 for making an inquiry about zoom-out of an image, image forming apparatus 100 receives signal 700 for that inquiry from terminal 120. Touch panel 101 displays operation method instruction information based on contents of answer to inquiry 750 included in signal 700. More specifically, touch panel 101 displays arrows 1520 and 1521 provided to two respective circles. The user can thus know that an image can be zoomed out by placing fingers on touch panel 101 and sliding the fingers inward. A signal for displaying arrows 1520 and 1521 is generated, for example, as the operator of terminal 120 presses a key allocated in advance in keyboard 3 of terminal 120 in a case that an operation mode of terminal 120 is set to a mode teaching a pinch-in operation. The generated signal is sent from terminal 120 to image forming apparatus 100 as operation method instruction information.

Figure 16:
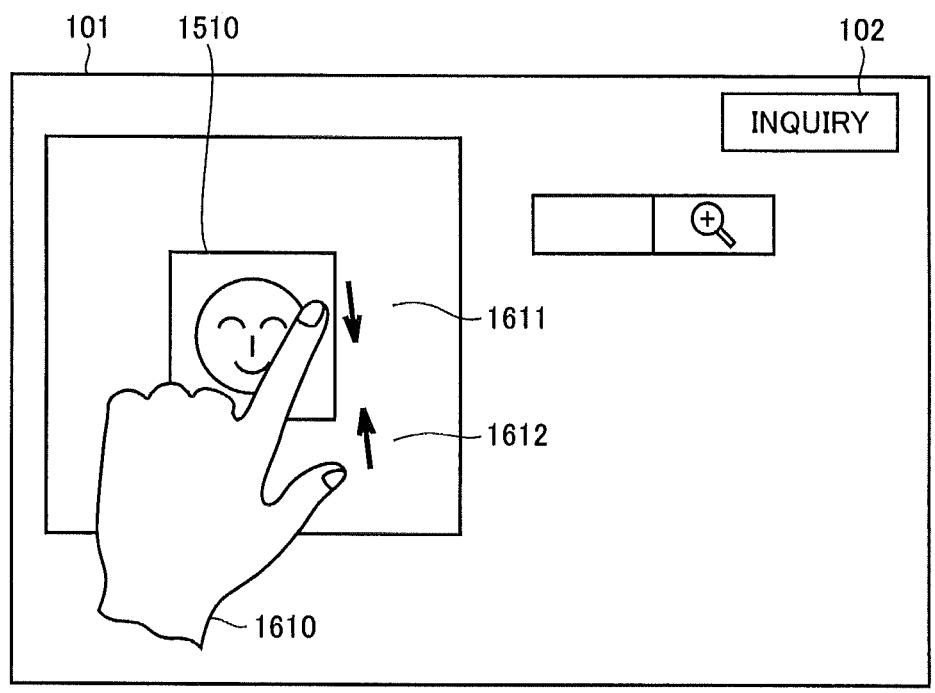
FIG. 16 is a diagram showing another example for illustrating a pinch-in operation.

FIG. 16 is a diagram showing another example for illustrating a pinch-in operation. In another aspect, touch panel 101 displays an image 1610 of a hand and arrows 1611 and 1612 facing inward at tip ends of a thumb and a forefinger, respectively, Such display is realized based on contents of answer to inquiry 750 included in signal 700 sent from terminal 120. The user can thus know that an image can be zoomed out by placing a hand on touch panel 101 and sliding fingers inward. A signal for displaying arrows 1611 and 1612 shown in FIG. 16 is also generated as in the case shown in FIG. 15 and transmitted from terminal 120 to image forming apparatus 100. Therefore, further detailed description will not be repeated.

(Rotation of Image)

Figure 17:
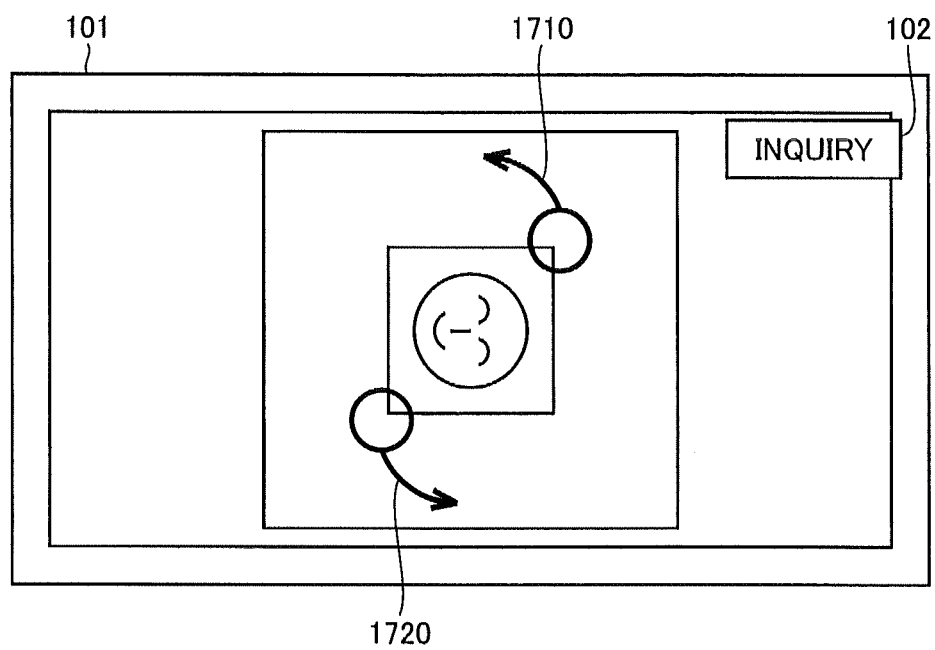
FIG. 17 is a diagram representing an operation in a case of rotation of a preview screen.

FIG. 17 is a diagram representing an operation in a case of rotation of a preview screen. In another aspect, the user may inquire terminal 120 about a method for rotation of an image displayed on touch panel 101. When image forming apparatus 100 receives signal 700 for such an inquiry from terminal 120, it displays arrows 1710 and 1720 in an arc shape for two respective circles as operation method instruction information. A signal for displaying arrows 1710 and 1720 is generated, for example, as the operator of terminal 120 presses a key allocated in advance in keyboard 3 of terminal 120 in a case that an operation mode of terminal 120 is set to a mode teaching rotational display. The generated signal is sent from terminal 120 to image forming apparatus 100 as operation method instruction information. Thus, in the example shown in FIG. 17, the user can know that an image can be rotated counterclockwise by placing two fingers on touch panel 101 and performing a rotational operation counterclockwise.

(Scroll)

Figure 18:
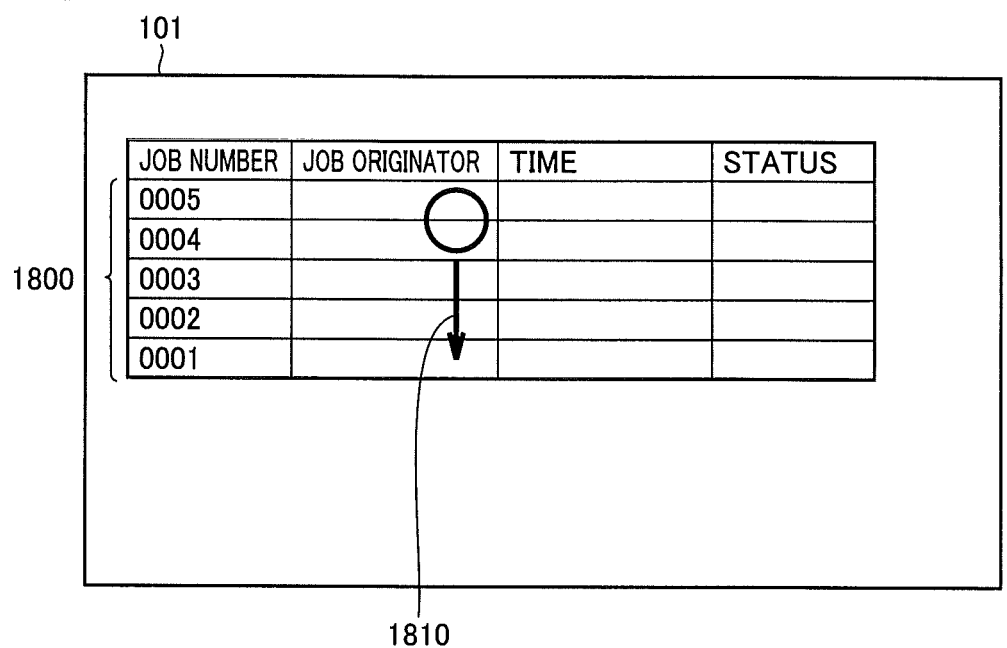
FIG. 18 is a diagram representing one example of operation method instruction information in a case of scroll of items in a list displayed on the touch panel.

FIG. 18 is a diagram representing one example of operation method instruction information in a case of scroll of items in a list 1800 displayed on touch panel 101. More specifically, touch panel 101 displays a circle and an arrow 1810 connected to the circle. A signal for displaying the circle and arrow 1810 is generated, for example, as the operator of terminal 120 presses a key allocated in advance in keyboard 3 of terminal 120 in a case that an operation mode of terminal 120 is set to a mode teaching scroll display. The generated signal is sent from terminal 120 to image forming apparatus 100 as operation method instruction information. The user can thus recognize that items included in list 1800 can be switched for display by placing a finger on the circle displayed on list 1800 and performing a slide operation in a direction shown with arrow 1810. When the operator of terminal 120 presses successively twice a key allocated in advance, an arrow having a length longer than arrow 1810 can be displayed, so that the user can recognize that scroll display of items included in list 1800 can be provided based on an amount of movement greater than a normal amount of movement (the number of items included in a list) by placing a finger on the circle displayed on list 1800 and performing a longer slide operation in a direction shown with arrow 1810.

(Another Manner of Operation Screen)

Figure 19:
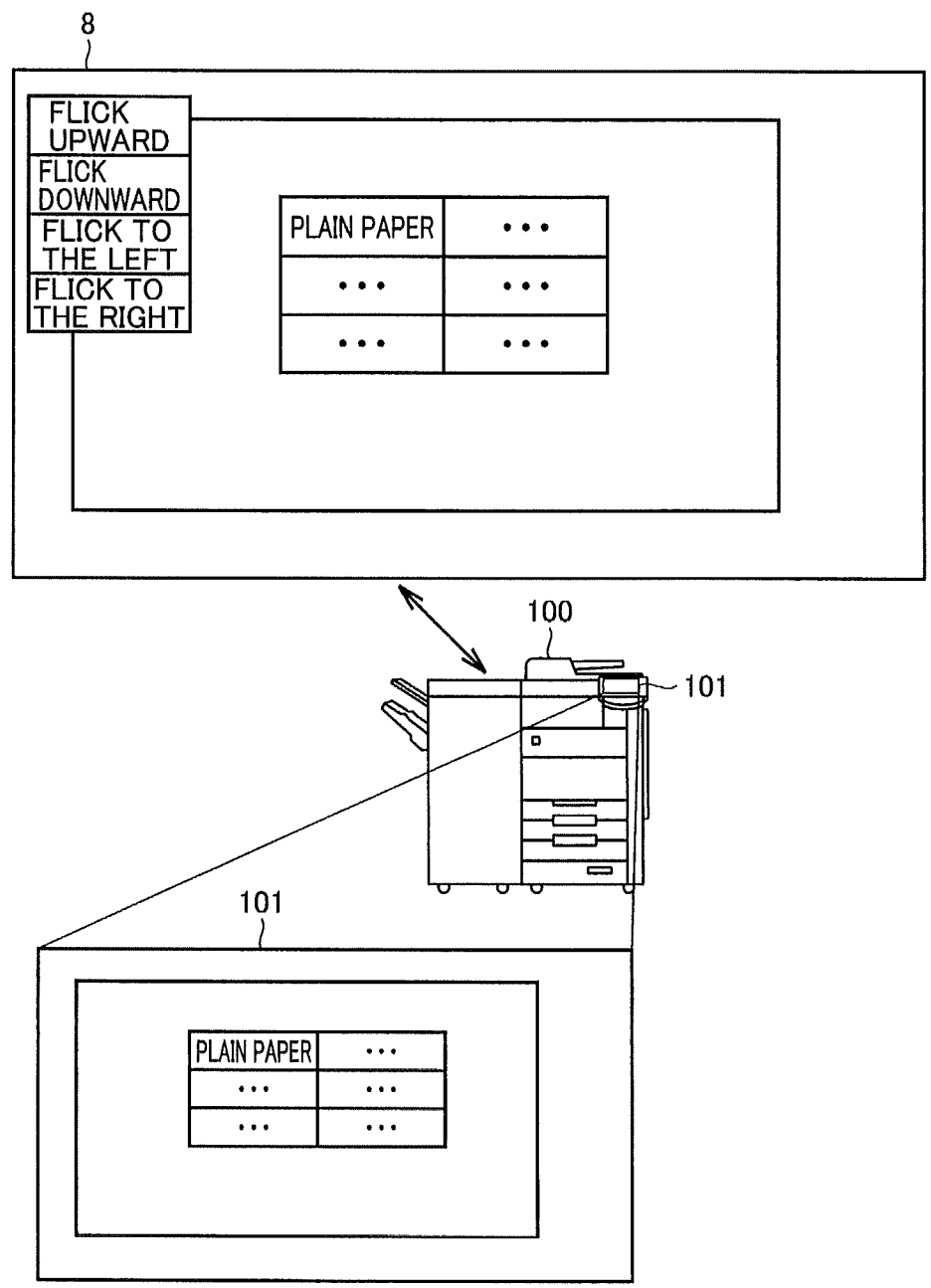
FIG. 19 is a diagram representing a screen displayed on each of a monitor of the terminal and the touch panel of the image forming apparatus.

Another manner of display of an operation screen on terminal 120 will be described with reference to FIG. 19. FIG. 19 is a diagram representing a screen displayed on each of monitor 8 of terminal 120 and touch panel 101 of image forming apparatus 100.

In a certain embodiment, an operation screen displayed on monitor 8 of terminal 120 and an operation screen displayed on touch panel 101 of image forming apparatus 100 may be different from each other. For example, monitor 8 may display an image for providing a command with another method, in addition to an operation screen displayed on touch panel 101. More specifically, monitor 8 may display an icon accepting each operation of flick upward, flick downward, flick to the left, and flick to the right as an operation method applicable to image forming apparatus 100. In a case that image forming apparatus 100 accepts these operations, when terminal 120 transmits these icons to image forming apparatus 100 as operation method instruction information, image forming apparatus 100 may display these icons and accept an operation onto any icon. Alternatively, in another aspect, image forming apparatus 100 may accept an operation defined by each icon without displaying an icon.

(Association of Key to Keyboard)

Figure 20:
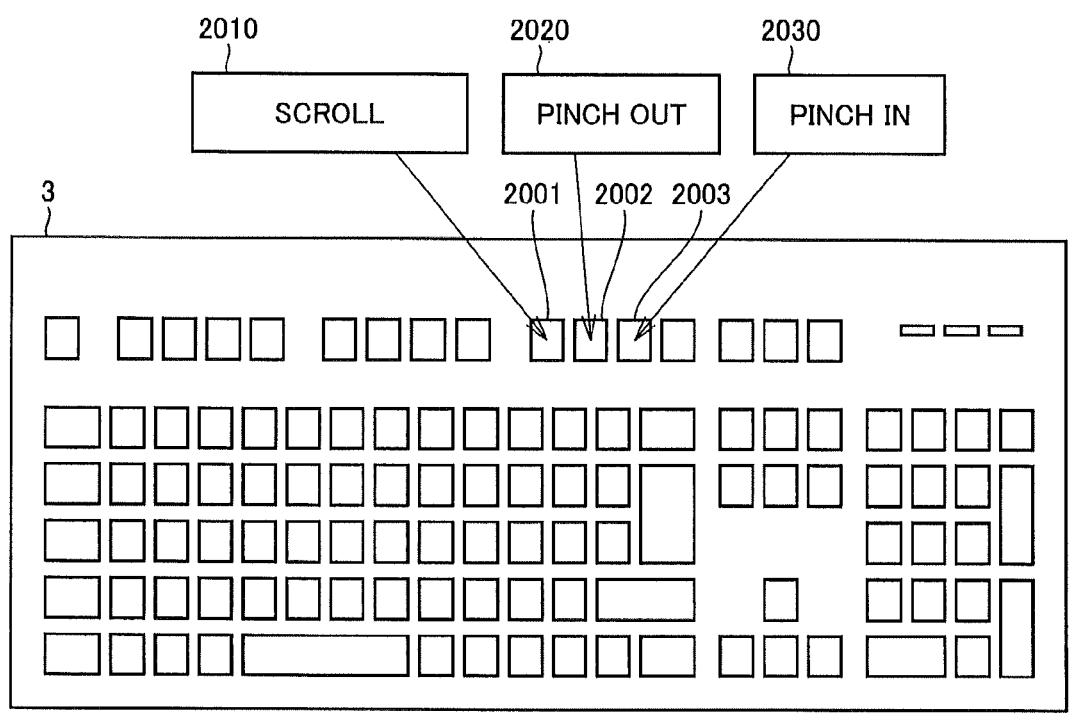
FIG. 20 is a diagram representing association in a keyboard of the terminal, of a key included in the keyboard with a function in the image forming apparatus.

Association between an operation and a key will be described with reference to FIG. 20. FIG. 20 is a diagram representing association in keyboard 3 of terminal 120, of a key included in keyboard 3 with a function in image forming apparatus 100.

In one aspect, there may also be a case that an input device of terminal 120 is implemented by keyboard 3 and monitor 8 is not an input device capable of accepting a multi-touch operation. In this case, the operator of terminal 120 cannot provide operation method instruction information with a multi-touch operation as an answer to an inquiry about an operation to image forming apparatus 100 having touch panel 101 accepting a multi-touch operation. Then, in one aspect, a multi-touch operation may be allocated in advance to any key in the keyboard 3 of terminal 120.

More specifically, in one aspect, for example, a key 2001 is associated with a scroll function 2010. A key 2002 is associated with a pinch-out function 2020. A key 2003 is associated with a pinch-in function 2030. Such association is made, for example, by a manager of terminal 120 and information on association is associated with identification information of image forming apparatus 100 and identification information of an operation screen displayed on touch panel 101 of image forming apparatus 100. Associated data is saved in hard disk 5 of terminal 120. Thus, even in a case that an input device of terminal 120 does not have a multi-touch function, the operator of terminal 120 can present to image forming apparatus 100 operation method instruction information of scroll function 2010 by pressing key 2001.

It is noted that data on association which terminal 120 can hold is not limited to image forming apparatus 100. With regard to other image forming apparatuses different in type from image forming apparatus 100 as well, similarly associated data may be saved in terminal 120. Thus, even in a case that various types of image forming apparatuses are connected to network 110, terminal 120 can transmit operation method instruction information to image forming apparatuses in accordance with an image forming apparatus which has transmitted an inquiry.

(Erase of Operation Method Instruction Information)

Figure 21A:
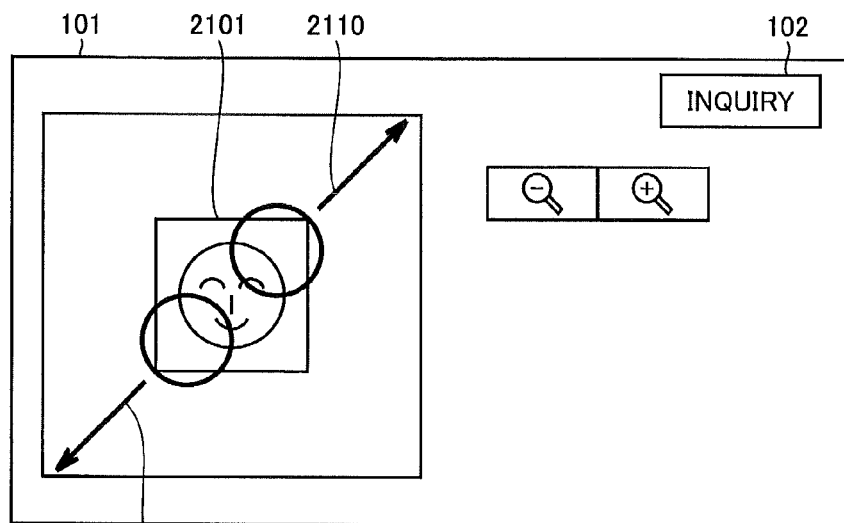
FIGS. 21A to 21C are each a diagram representing transition of display of operation method instruction information on the touch panel.
Figure 21B:
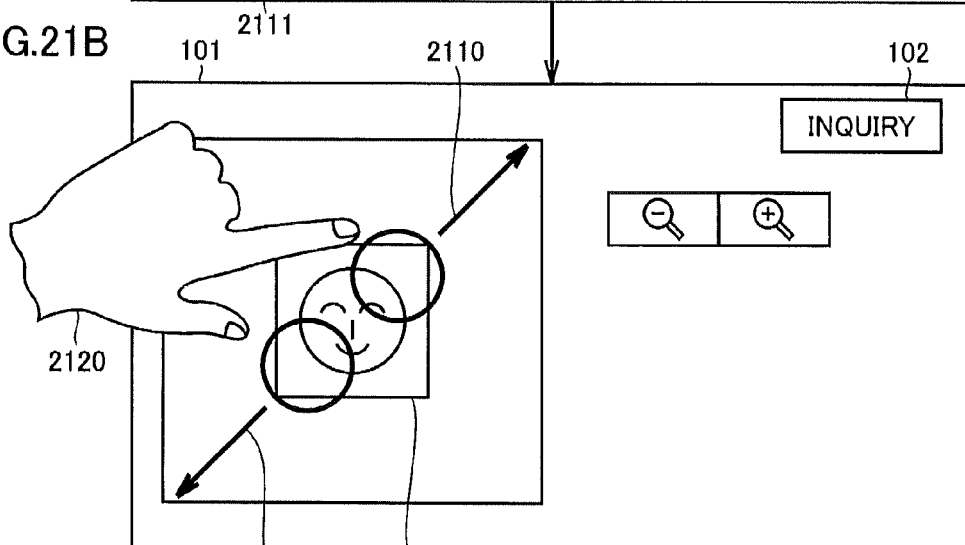
Figure 21C:
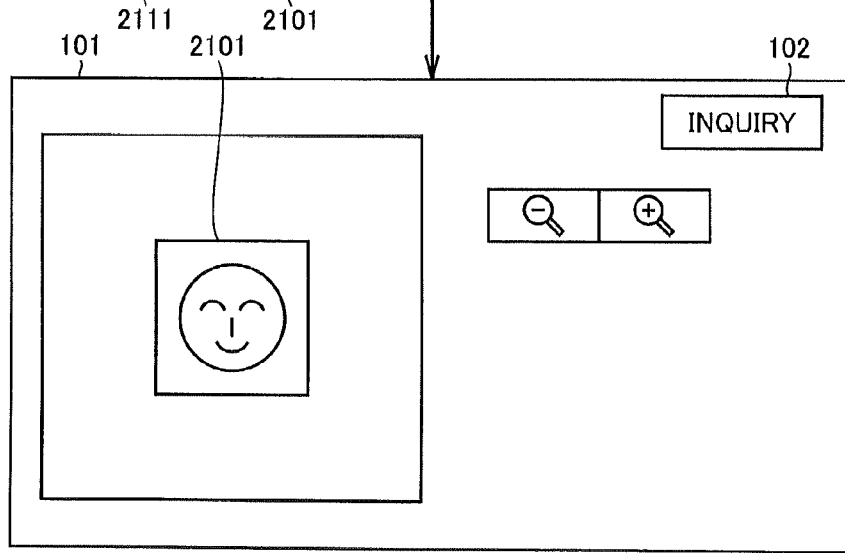

Erase of operation method instruction information in touch panel 101 will be described with reference to FIGS. 21A to 21C. FIGS. 21A to 21C are each a diagram representing transition of display of operation method instruction information on touch panel 101.

As shown, in FIG. 21A, in one aspect, touch panel 101 displays as operation information instruction information, two circles and arrows 2110 and 2111 in a display area 2101 in an image.

When a state of touch panel 101 makes transition from a state in FIG. 21A to a state in FIG. 21B, a user performs, for example, a pinch-out operation in accordance with displayed operation method instruction information, by actually using his/her own hand 2120. When touch panel 101 senses that an operation the same as the operation method instruction information has actually been performed, control unit 210 causes a screen to be displayed, with the operation method instruction information displayed on touch panel 101 having been removed as shown in FIG. 21C. By doing so, the user is invited to memorize little by little an operation method about which the user has inquired, and therefore, a learning effect of the user is enhanced and the number of inquiries made about an operation method can also be decreased.

[Control Structure]

Figure 22:
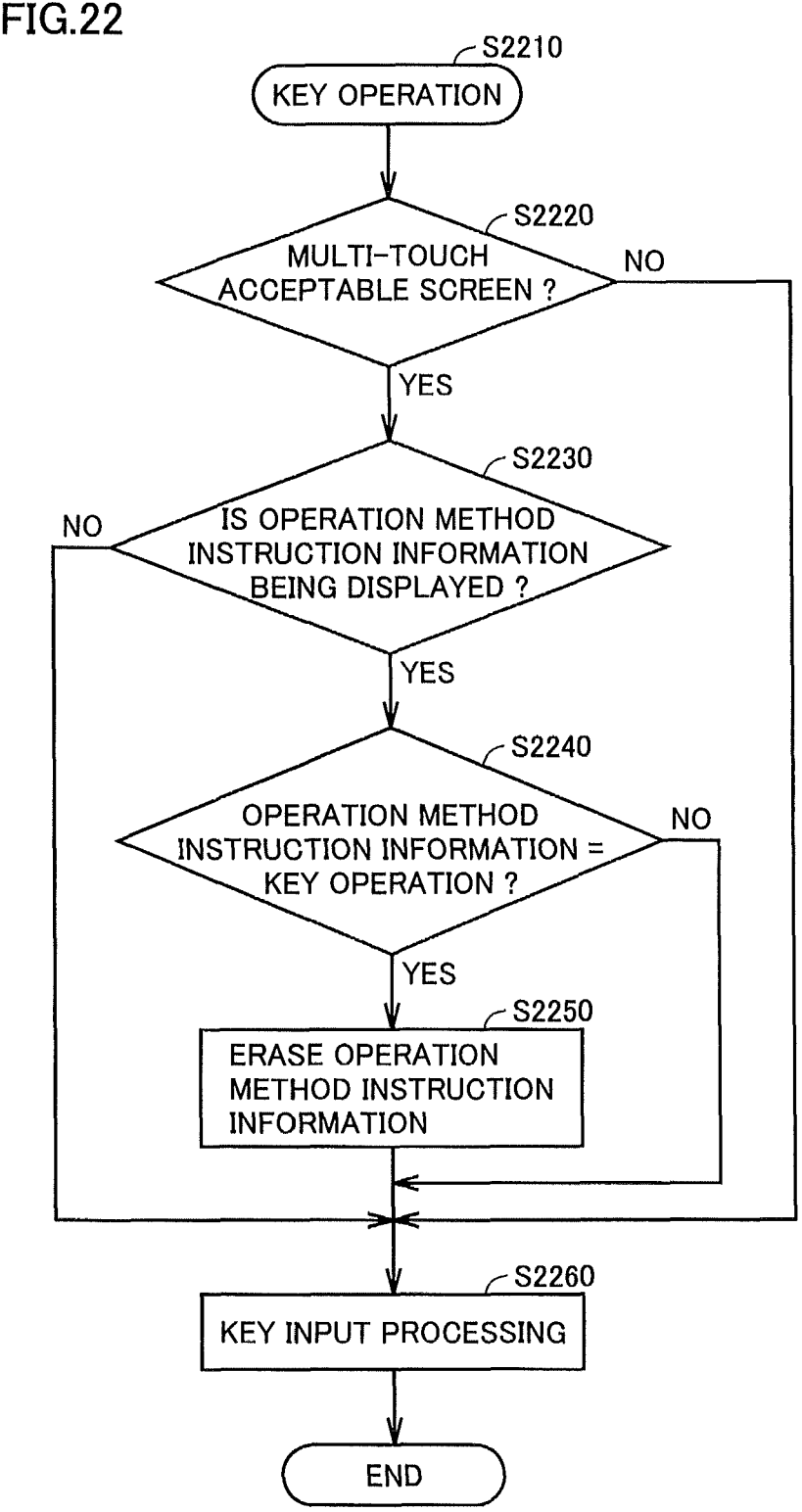
FIG. 22 is a diagram representing a part of a series of processes performed by a control unit of the image forming apparatus realizing state transition shown in FIG. 21.

A control structure for realizing an operation shown in FIG. 21 will be described with reference to FIG. 22. FIG. 22 is a diagram representing a part of a series of processes performed by control unit 210 of image forming apparatus 100 realizing state transition shown in FIG. 21.

In step S2210, control unit 210 detects a key operation for an inquiry from a user of image forming apparatus 100, based on a signal from touch panel 101. In response to detection of the key operation, image forming apparatus 100 transmits signal 600 for making an inquiry to terminal 120. Image forming apparatus 100 receives signal 700 from terminal 120.

In step S2220, control unit 210 determines whether or not a screen currently displayed on touch panel 101 is a screen capable of accepting a multi-touch operation. This determination is made, for example, based on screen identification data saved in memory 230. Screen identification data includes, for example, information representing whether or not touch panel 101 of image forming apparatus 100 can accept multi-touch. When control unit 210 determines that the screen can accept a multi-touch operation (YES in step S2220), it switches control to step S2230. Otherwise (NO in step S2220), control unit 210 switches control to step S2260.

In step S2230, control unit 210 determines whether or not touch panel 101 is displaying operation method instruction information. When control unit 210 determines that operation method instruction information is being displayed on touch panel 101 (YES in step S2230), it switches control to step S2240. Otherwise (NO in step S2230), control unit 210 switches control to step S2260.

In step S2240, control unit 210 determines whether or not operation method instruction information displayed on touch panel 101 matches with a key operation actually performed by the user onto touch panel 101. It is noted that the key operation may be any of a multi-touch operation onto touch panel 101 and an operation onto a hard key other than touch panel 101, which will provide an instruction similarly to the multi-touch operation. When control unit 210 determines that the operation method instruction information matches with the key operation (YES in step S2240), it switches control to step S2250. Otherwise (NO in step S2240), control unit 210 switches control to S2260.

In step S2250, control unit 210 erases the operation method instruction information displayed on touch panel 101. Thus, touch panel 101 enters a normal state before the operation method instruction information is displayed. It is noted that operation method instruction information is erased, for example, as rendering processing is performed on data other than operation method instruction information in a work area of memory 230.

In step S2260, control unit 210 actually performs key input processing based on an operation provided onto touch panel 101.

It is noted that image forming apparatus 100 may transmit a result of determination in step S2240 to terminal 120 in another aspect. The result of determination includes, for example, identification information of image forming apparatus 100, identification information of a screen in which the operation was performed, and information indicating whether or not an operation was correctly performed. Terminal 120 accumulates results of determination. Terminal 120 can thus obtain a log of operations in image forming apparatus 100. This log can be used for improvement of an operation screen of image forming apparatus 100.

<Image Forming Apparatus which can be Operated by Wirelessly Connected Touch Panel>

[Technical Concept]

Figure 23:
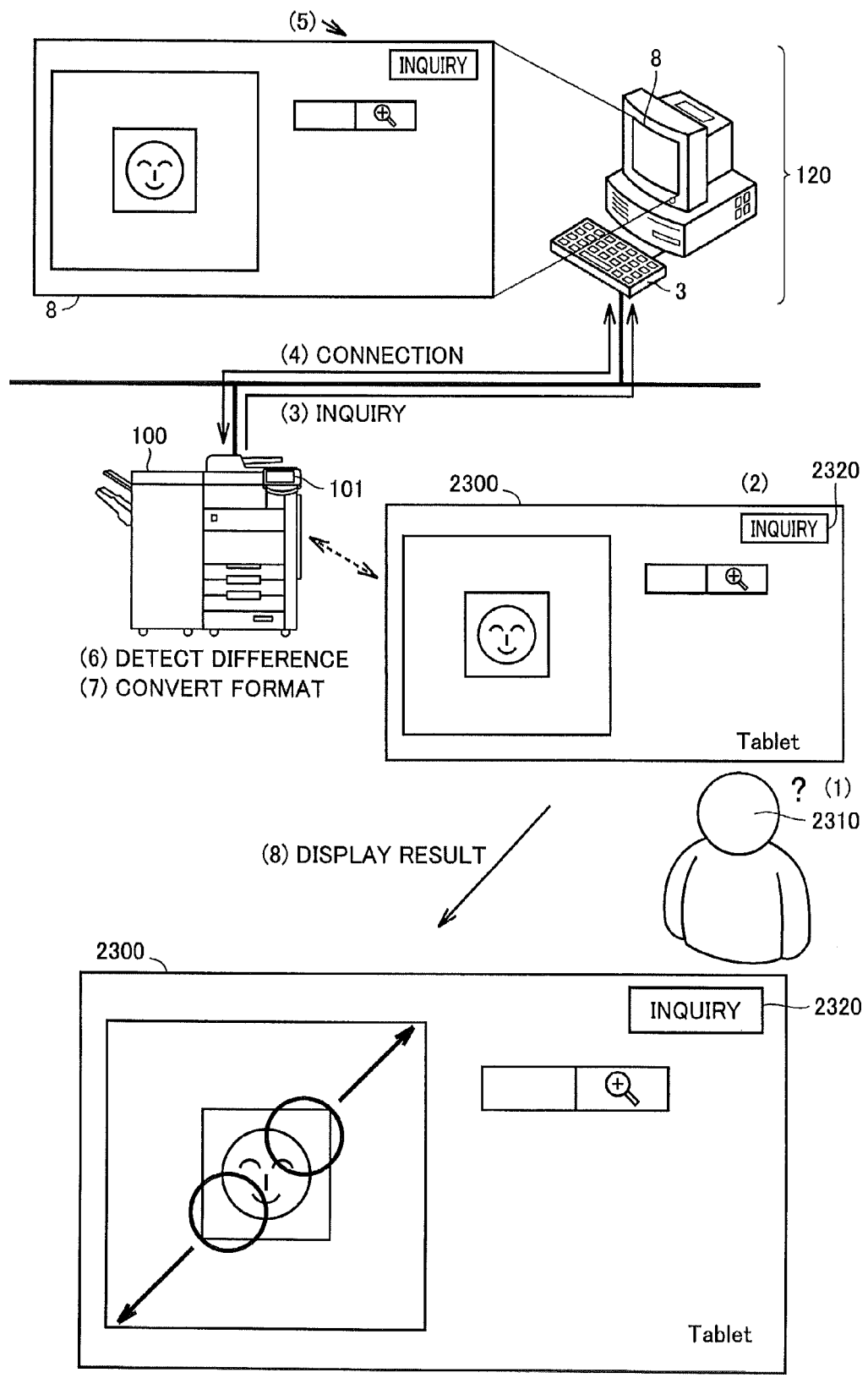
FIG. 23 is a diagram representing a technical concept in a case that the touch panel capable of wireless communication with the image forming apparatus can operate the image forming apparatus.

A case that image forming apparatus 100 can be operated with an external touch panel will be described below with reference to FIGS. 23 to 25. FIG. 23 is a diagram representing a technical concept of a case that a touch panel 2300 which can establish wireless communication with image forming apparatus 100 can operate image forming apparatus 100.

As shown in FIG. 23, in one aspect, image forming apparatus 100 is wirelessly connected to touch panel 2300. Touch panel 2300 is implemented by a tablet terminal and other portable wireless communication terminal in one aspect. In another aspect, touch panel 2300 may be implemented by removable touch panel 101 of image forming apparatus 100.

(Stage 1) A user 2310 uses touch panel 2300 to operate image forming apparatus 100. Here, user 2310 may not know an operation method.

(Stage 2) User 2310 inquires terminal 120 about a method of operating image forming apparatus 100. More specifically, user 2310 presses an inquiry icon 2320 on touch panel 2300. In another aspect, user 2310 may press a hard key defined in advance as a switch for making an inquiry. Touch panel 2300 transmits the fact that an inquiry has been made to image forming apparatus 100. It is noted that a communication format between touch panel 2300 and image forming apparatus 100 is not particularly limited. For example, Bluetooth (trademark), Wi-Fi (Wireless Fidelity), and other wireless communication techniques are used for communication, however, a communication method is not limited to those exemplified here.

(Stage 3) Image forming apparatus 100 transmits signal 600 for making an inquiry about an operation method to terminal 120 located in a service center, in response to an inquiry from touch panel 2300.

(Stage 4) Terminal 120 establishes connection for providing operation method instruction information to image forming apparatus 100, in response to reception of signal 600 from image forming apparatus 100.

(Stage 5) An operator in the service center, that is, a user of terminal 120, presses a key associated with a zoom-in function among a plurality of keys in keyboard 3 of terminal 120, in order to tell image forming apparatus 100 an operation for zooming in a screen in a multi-touch panel. Terminal 120 generates information for association of pressing of the key and an icon accepting a zoom-in operation on touch panel 101 of image forming apparatus 100 with each other. This information corresponds, for example, to answer to inquiry 750 included in signal 700. Answer to inquiry 750 includes model information of keyboard 3 as operation means of terminal 120. Terminal 120 transmits signal 700 to image forming apparatus 100.

(Stage 6) Image forming apparatus 100 which has received signal 700 detects a difference between keyboard 3 and touch panel 2300. For example, control unit 210 detects a difference in input scheme (for example, a touch operation or a keyboard operation), a size of an input device (for example, a size of an operation detection area in the touch panel), and a difference in accepted function (for example, a position of an icon accepting a zoom-in operation and an identification number of a key in keyboard 3 to which a zoom-in operation has been allocated), based on model information of touch panel 2300 and model information of keyboard 3.

(Stage 7) In image forming apparatus 100, control unit 210 converts contents of answer to inquiry 750 to contents adapted to a form of touch panel 2300. For example, in a case that answer to inquiry 750 includes as a specific answer, "pressing of a key accepting an operation for zoom-in of an image," control unit 210 converts operation method instruction information based on answer to inquiry 750 to an image representing a pinch-out operation (that is, operation method instruction information) in touch panel 2300. Information for this conversion is saved, for example, in ROM 220, memory 230, hard disk device 240, or another storage device. Control unit 210 transmits the converted operation method instruction information to touch panel 2300.

(Stage 8) Touch panel 2300 displays the operation method instruction information in a display area of touch panel 2300, together with an image of which preview display is being provided, based on a signal received from image forming apparatus 100. In the example in FIG. 23, operation method instruction information is shown with circles and arrows.

(Functional Configuration)

Image forming apparatus 100 according to this aspect includes touch panel 101 for displaying an operation screen of image forming apparatus 100, a first communication interface for communicating with terminal 120, a second communication interface for communicating with an image display terminal having a touch panel, and control unit 210 for controlling an operation of image forming apparatus 100. Control unit 210 is configured to transmit an operation screen to the image display terminal, receive an inquiry signal sent from the image display terminal for making an inquiry about an operation method using the operation screen, transmit the inquiry signal to terminal 120, combine operation method instruction information transmitted by terminal 120 in response to the inquiry signal with the operation screen, and transmit a signal resulting from combination to the image display terminal.

[Control Structure]

A control structure of image forming apparatus 100 according to another aspect will be described with reference to FIGS. 24 and 25.

(Inquiry)

Figure 24:
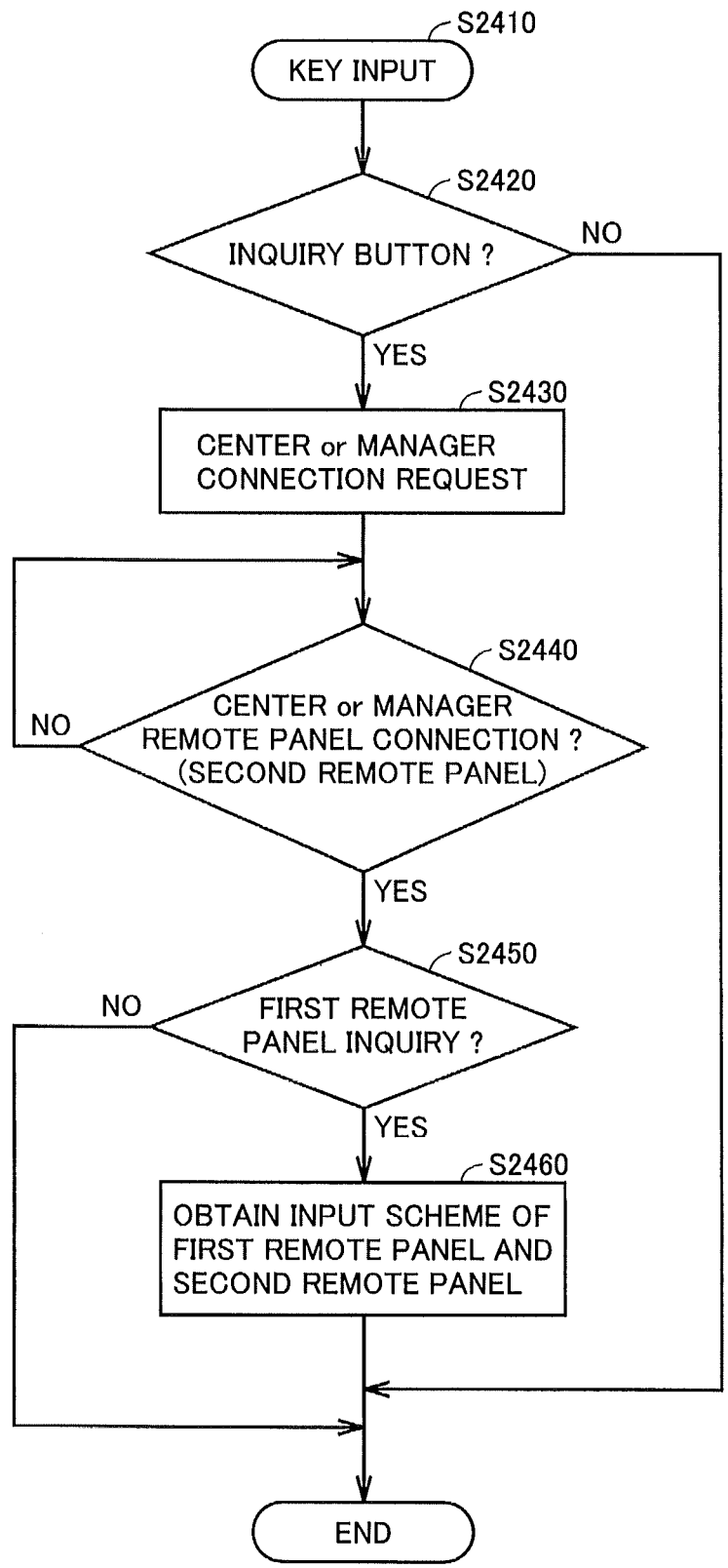
FIG. 24 is a flowchart representing a part of processing performed by the control unit of the image forming apparatus for making an inquiry.

FIG. 24 is a flowchart representing a part of processing performed by control unit 210 for image forming apparatus 100 for making an inquiry.

In step S2410, image forming apparatus 100 senses a key input (a touch operation) onto touch panel 2300 based on a signal from wirelessly connected touch panel 2300.

In step S2420, control unit 210 determines whether or not icon 2320 for making an inquiry has been pressed based on the signal received from touch panel 2300. When control unit 210 determines that icon 2320 has been pressed (YES in step S2420), it switches control to step S2430. Otherwise (NO in step S2420), control unit 210 ends the process and causes image forming apparatus 100 to perform an operation based on a touch operation other than icon 2320.

In step S2430, control unit 210 transmits a request for connection to a service center or a manager for making an inquiry about an operation from user 2310 of touch panel 2300. For example, control unit 210 transmits a connection request to terminal 120.

In step S2440, control unit 210 determines whether or not image forming apparatus 100 and terminal 120 have been connected to each other based on a signal from terminal 120 in the service center or of the manager. When control unit 210 determines that connection between terminal 120 in the service center or of the manager and image forming apparatus 100 has been established (YES in step S2440), it switches control to step S2450. Otherwise (NO in step S2440), control unit 210 stands by for a period of time set in image forming apparatus 100 and again performs the processing in step S2440.

In step S2450, control unit 210 determines whether or not to inquire terminal 120 about an operation method in touch panel 2300. This determination is made, for example, based on whether or not contents of inquiry included in a signal received from touch panel 2300 can be answered by image forming apparatus 100. Information for this determination is saved in ROM 220, memory 230, or hard disk device 240 as the specifications of image forming apparatus 100. When control unit 210 determines that an inquiry about an operation method is to be made to terminal 120 (YES in step S2450), it switches control to step S2460. Otherwise (NO in step S2450), control unit 210 ends the process.

In step S2460, control unit 210 obtains a scheme of input to terminal 120 based on answer to inquiry 750 included in signal 700 sent from terminal 120. More specifically, control unit 210 senses that input means of terminal 120 is implemented by keyboard 3. In addition, control unit 210 also obtains an input scheme of touch panel 2300 based on the signal received from touch panel 2300.

(Display of Operation Method Instruction Information)

Figure 25:
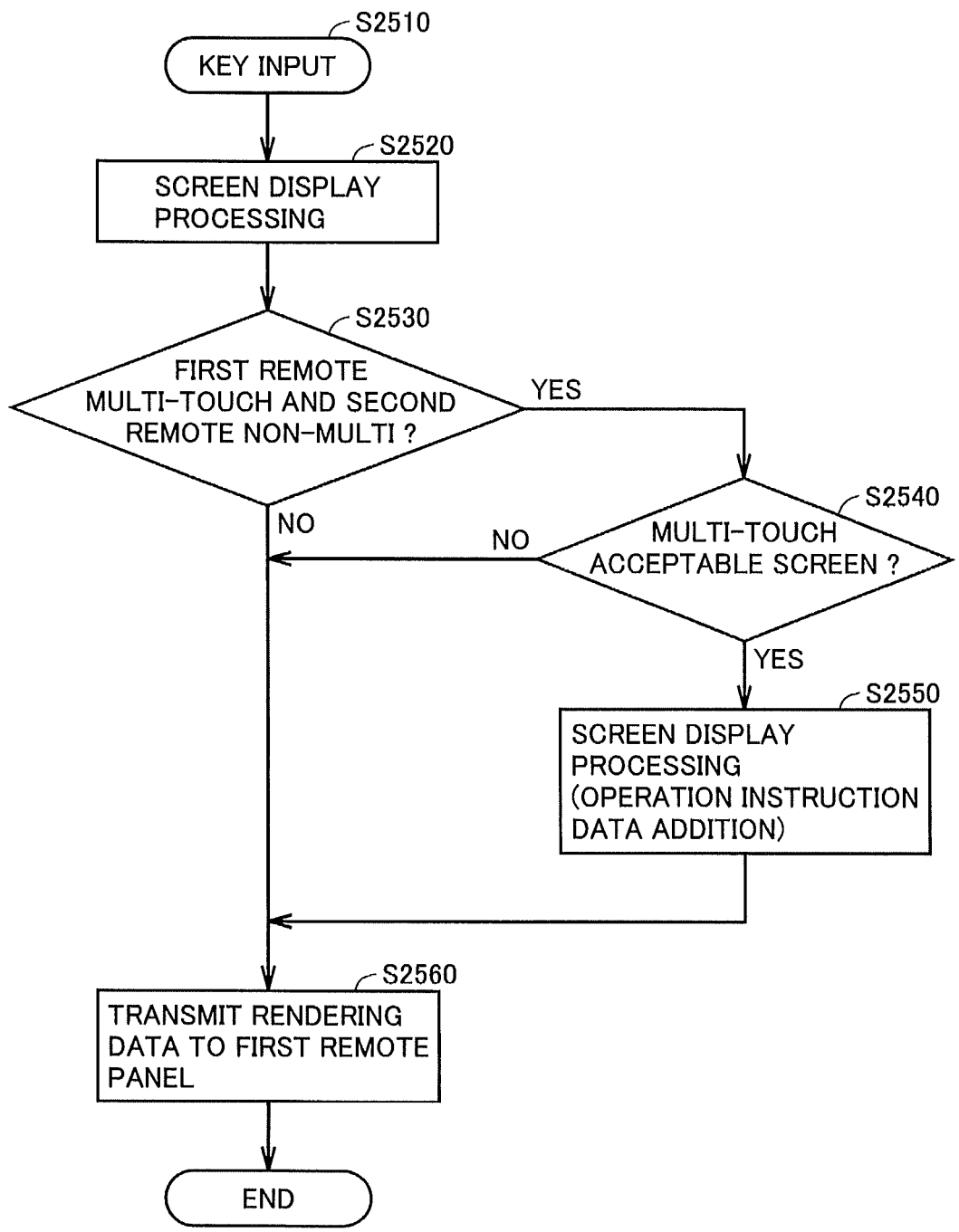
FIG. 25 is a flowchart representing processing for causing the touch panel to display a screen for guidance on an operation.

FIG. 25 is a flowchart representing processing for causing touch panel 2300 to display a screen for guidance on an operation.

In step S2510, control unit 210 senses a key input based on an operation onto touch panel 2300.

In step S2520, control unit 210 performs processing for displaying a screen in response to a detected key input. Here, touch panel 2300 and image forming apparatus 100 communicate with each other through Wi-Fi, NFC (Near Field Communication), and other near field wireless communication. Image forming apparatus 100 transmits to touch panel 2300, a signal for displaying an operation screen of image forming apparatus 100. When touch panel 2300 receives that signal, it displays an operation screen.

The user of touch panel 2300 can remotely operate image forming apparatus 100 by using the operation screen displayed on touch panel 2300. Thereafter, when the user desires to use a function of which operation method he/she does not know, he/she presses icon 2320 for making an inquiry displayed on touch panel 2300. Then, touch panel 2300 transmits a signal for making an inquiry about an operation method to image forming apparatus 100. This signal includes identification information and the specifications of touch panel 2300, identification information of an operation screen displayed on touch panel 2300, and an operation method to be inquired about. The specifications of the touch panel include information indicating whether or not touch panel 2300 can accept a multi-touch operation. The operation method is, for example, zoom-in, zoom-out, and rotation of an image, and other functions executable by image forming apparatus 100.

Image forming apparatus 100 generates signal 600 for making an inquiry to terminal 120 based on the signal received from touch panel 2300. In this case, destination address 610 of signal 600 is a network address of terminal 120. Sender address 620 is an address of image forming apparatus 100. It is noted that inquiry contents 650 include information indicating that inquiry contents are an inquiry from touch panel 2300. Image forming apparatus 100 transmits signal 600 to terminal 120.

When terminal 120 receives signal 600 from image forming apparatus 100, it transmits as signal 700 to image forming apparatus 100, operation method instruction information representing an operation method about which an inquiry has been received. Though destination address 710 of signal 700 includes an address of image forming apparatus 100, answer to inquiry 750 includes the fact that a subject who made an inquiry is touch panel 2300. Therefore, when control unit 210 of image forming apparatus 100 receives such a signal 700, it performs subsequent processing as an answer to touch panel 2300 for a remote operation, rather than an answer to touch panel 101 of image forming apparatus 100.

In step S2530, control unit 210 determines whether or not touch panel 2300 serving as a first remote panel is able to accept a multi-touch operation and whether or not an input device of terminal 120 serving as a second remote panel is unable to accept a multi-touch operation. When control unit 210 determines that touch panel 2300 is able to accept a multi-touch operation and the input device of terminal 120 is unable to accept a multi-touch operation (YES in step S2530), it switches control to step S2540. For example, an input format of terminal 120 is a format using keyboard 3, control is moved to step S2540. Otherwise (NO in step S2530), control unit 210 switches control to step S2560. For example, when input formats of touch panel 2300 and terminal 120 both can accept a multi-touch operation, control is moved to step S2560.

In step S2540, control unit 210 determines whether or not a screen displayed on touch panel 101 (that is, an operation screen of touch panel 2300) is a screen capable of accepting multi-touch. When control unit 210 determines that a screen displayed on touch panel 101 is a screen capable of accepting multi-touch (YES in step S2540), it switches control to step S2550. Otherwise (NO in step S2540), control unit 210 switches control to step S2560.

In step S2550, control unit 210 performs screen display processing. More specifically, data resulting from combination between a screen displayed on touch panel 101 and operation method instruction information representing an answer to an inquiry is generated. In this case, since an input format of terminal 120 is not adapted to a multi-touch operation, the operator of terminal 120 gives an answer by using keyboard 3 to an inquiry from the user of touch panel 2300 (see FIG. 20). Therefore, signal 700 from terminal 120 includes information associating a key in keyboard 3 (for example, keys 2001, 2002, and 2003) and a function about which an inquiry has been received with each other. Then, control unit 210 converts an operation using keyboard 3 to operation method instruction information on a screen of touch panel 2300 capable of accepting a multi-touch operation, based on table information indicating correspondence between a key and operation method instruction information stored in advance in memory 230. Control unit 210 generates rendering data for an answer to touch panel 2300 such that the operation method instruction information is displayed as being superimposed on the operation screen.

In step S2560, control unit 210 transmits rendering data for guidance on an operation method to touch panel 2300. Touch panel 2300 displays information representing an operation method together with a screen, based on that data.

Effect of Embodiment

As above, according to image forming apparatus 100 in the present embodiment, image forming apparatus 100 can present an operation method to a user unfamiliar with a multi-touch operation. In another aspect, even in a case that terminal 120 in a service center is a terminal not having a multi-touch function, image forming apparatus 100 can provide guidance on an operation method to the user.

It is noted that description of the embodiment described above is given assuming that an operation of image forming apparatus 100 is realized as control unit 210 included in image forming apparatus 100 executes a program. A configuration of image forming apparatus 100, however, is not limited to that as disclosed herein. For example, image forming apparatus 100 may perform all or some of steps performed by control unit 210 with the use of circuit elements and other hardware performing process steps.

Features shown in the embodiment described above may also be combined as appropriate, in addition to those exemplified.

Although the present invention has been described and illustrated in detail, it is clearly understood that the same is by way of illustration and example only and is not to be taken by way of limitation, the scope of the present invention being interpreted by the terms of the appended claims.

What is claimed is:
1. An image forming apparatus, comprising:
a communication portion for communicating with an information terminal through a network;
a monitor including a touch panel configured to accept a multi-touch operation, for displaying an operation screen of said image forming apparatus; and a controller for controlling an operation of said image forming apparatus, said controller being configured to:
(i) transmit an inquiry signal about an operation method using the operation screen displayed on said monitor to said information terminal through said communication portion,
(ii) receive through said communication portion, operation method instruction information including information transmitted by said information terminal based on the inquiry signal for indicating said multi-touch operation, and (iii) cause said monitor to display said operation screen and an operation instruction based on said operation method instruction information, wherein an input format of the information terminal differs from an input format of the image forming apparatus.

2. The image forming apparatus according to claim 1, wherein
said inquiry signal includes apparatus identification information for identifying said image forming apparatus and screen identification information for identifying said operation screen.

3. The image forming apparatus according to claim 1, wherein
when a command for zoom-in of the screen displayed on said monitor is given twice to said image forming apparatus from said information terminal, said monitor is configured to increase, by magnitude defined in advance, a zoom-in factor of the screen in accordance with a second command, as compared with a zoom-in factor of the screen in accordance with a first command.

4. The image forming apparatus according to claim 1, wherein
when a command for zoom-in of the screen displayed on said monitor is given to said image forming apparatus from said information terminal and successively a zoom-out command is given to said image forming apparatus, said monitor is configured to zoom in the screen based on said command for zoom-in and zoom out the screen by using a zoom-out factor smaller by a prescribed ratio than a ratio defined in advance, based on said command for zoom-out.

5. The image forming apparatus according to claim 1, wherein
said monitor is configured to switch contents in a list for display by increasing the number of switched items in display contents based on a second command following a first command by a number defined in advance as compared with the number of switched items based on said first command when a command for switching display contents in the list is given twice to said image forming apparatus from said information terminal while the list showing a plurality of items in a list is displayed.

6. The image forming apparatus according to claim 1, wherein
when an inquiry about said operation method includes an inquiry about zoom-in of the screen displayed on said monitor, said operation method instruction information indicates a method for pinch-out of said screen.

7. The image forming apparatus according to claim 1, wherein
when an inquiry about said operation method includes an inquiry about zoom-out of the screen displayed on said monitor, said operation method instruction information indicates a method for pinch-in of said screen.

8. The image forming apparatus according to claim 1, wherein
when an inquiry about said operation method includes an inquiry about rotation, said operation method instruction information indicates a method for said rotation.

9. The image forming apparatus according to claim 1, wherein
when an inquiry about said operation method includes an inquiry about scroll, said operation method instruction information indicates a method for said scroll.

10. The image forming apparatus according to claim 1, wherein
an operation instruction based on said operation method instruction information includes any of a still image and a moving image.

11. The image forming apparatus according to claim 1, wherein
when an operation in accordance with the operation method instruction information displayed on said monitor is performed on said image forming apparatus, said monitor is configured not to display said operation method instruction information.

12. The image forming apparatus of claim 1, wherein
the inquiry signal corresponds to an inquiry about a transformation or a movement of an image displayed on said monitor, and the operation method instruction information indicates a multi-touch operation corresponding to the inquiry.

13. An image forming apparatus, comprising:
a monitor including a touch panel configured to accept a multi-touch operation, for displaying an operation screen of said image forming apparatus;
a first communication interface for communicating with an information terminal;
a second communication interface for communicating with an image display terminal having a touch panel; and
a controller for controlling an operation of said image forming apparatus,
said controller being configured to:
(i) transmit said operation screen to said image display terminal,
(ii) receive an inquiry signal sent from said image display terminal for making an inquiry about an operation method using said operation screen,
(iii) transmit said inquiry signal to said information terminal,
(iv) combine operation method instruction information including information transmitted by said information terminal based on said inquiry signal for indicating said multi-touch operation with said operation screen, and
(v) transmit a signal resulting from combination to said image display terminal.

14. A method for guidance on an operation method by an image forming apparatus having a monitor including a touch panel configured to accept a multi-touch operation, comprising:
communicating with an information terminal through a network; displaying an operation screen of said image forming apparatus on a monitor; and controlling an operation of said image forming apparatus, said controlling step including
(i) transmitting an inquiry signal about an operation method using an operation screen displayed on said monitor to said information terminal,
(ii) receiving operation method instruction information including information transmitted by said information terminal based on said inquiry signal for indicating said multi-touch operation, and
(iii) causing said monitor to display said operation screen and an operation instruction based on said operation method instruction information,
wherein an input format of the information terminal differs from an input format of the image forming apparatus.

15. A non-transitory computer-readable storage medium storing a program for causing a controller of an image forming apparatus, said program causing said controller to perform the method of claim 14.

16. The method of claim 14, wherein
the inquiry signal corresponds to an inquiry about a transformation or a movement of an image displayed on said monitor, and
the operation method instruction information indicates a multi-touch operation corresponding to the inquiry.

17. A method for guidance on an operation method by an image forming apparatus having a monitor including a touch panel configured to accept a multi-touch operation, comprising:
displaying an operation screen of said image forming apparatus;
communicating with an information terminal;
communicating with an image display terminal having a touch panel; and
controlling an operation of said image forming apparatus, said controlling step including
(i) transmitting said operation screen to said image display terminal,
(ii) receiving an inquiry signal sent from said image display terminal for making an inquiry about an operation method using said operation screen,
(iii) transmitting said inquiry signal to said information terminal,
(iv) combining operation method instruction information including information transmitted by said information terminal based on said inquiry signal for indicating said multi-touch operation with said operation screen, and
(v) transmitting a signal resulting from combination to said image display terminal.

18. A non-transitory computer-readable storage medium storing a program for causing a controller of an image forming apparatus, said program causing said controller to perform the method of claim 17.

19. A system, comprising: an image forming apparatus; and
an information terminal configured to communicate with said image forming apparatus through a network,
said image forming apparatus including:
a communication portion for communicating with said information terminal,
a monitor including a touch panel configured to accept a multi-touch operation, for displaying an operation screen of said image forming apparatus, and
a controller for controlling an operation of said image forming apparatus, and said controller being configured to:
(i) transmit an inquiry signal about an operation method using the operation screen displayed on said monitor to said information terminal through said communication portion,
(ii) receive through said communication portion, operation method instruction information including information transmitted by said information terminal based on said inquiry signal for indicating said multi-touch operation, and
(iii) cause said monitor to display said operation screen and an operation instruction based on said operation method instruction information,
wherein an input format of the information terminal differs from an input format of the image forming apparatus.

20. The system according to claim 19, wherein
said information terminal includes a keyboard, and
said controller is configured to cause said monitor to display as said operation method instruction information, said operation method instruction information by associating a key included in said keyboard and a touch operation on an operation screen of said monitor with each other.

21. The system of claim 19, wherein
the inquiry signal corresponds to an inquiry about a transformation or a movement of an image displayed on said monitor, and
the operation method instruction information indicates a multi-touch operation corresponding to the inquiry.

* * * * *